US009037519B2

(12) United States Patent
Han et al.

(10) Patent No.: US 9,037,519 B2
(45) Date of Patent: May 19, 2015

(54) URBAN TRAFFIC STATE DETECTION BASED ON SUPPORT VECTOR MACHINE AND MULTILAYER PERCEPTRON

(71) Applicant: ENJOYOR COMPANY LIMITED, Hangzhou (CN)

(72) Inventors: Lu-Sha Han, Hangzhou (CN); Hui Wang, Hangzhou (CN); Hong Peng, Hangzhou (CN); Limin Meng, Hangzhou (CN); Ke Lin Du, Hangzhou (CN)

(73) Assignee: Enjoyor Company Limited, Hangzhou (CN)

( * ) Notice: Subject to any disclaimer, the term of this patent is extended or adjusted under 35 U.S.C. 154(b) by 282 days.

(21) Appl. No.: 13/654,567

(22) Filed: Oct. 18, 2012

(65) Prior Publication Data

US 2014/0114885 A1   Apr. 24, 2014

(51) Int. Cl.
  *G06F 15/18* (2006.01)
  *G08G 1/01* (2006.01)
  *G06N 3/04* (2006.01)
  *G06N 99/00* (2010.01)

(52) U.S. Cl.
  CPC ............ *G08G 1/0133* (2013.01); *G06N 3/0454* (2013.01); *G06N 99/005* (2013.01)

(58) Field of Classification Search
  CPC ..... G06N 3/08; G06N 3/0454; G06N 99/005; G08G 1/01; G08G 1/0104; G08G 1/052; G06F 15/18
  USPC ................................................ 706/12, 13, 20
  See application file for complete search history.

(56) References Cited

U.S. PATENT DOCUMENTS

| | | | |
|---|---|---|---|
| 2006/0106530 A1* | 5/2006 | Horvitz et al. | 701/117 |
| 2010/0070253 A1* | 3/2010 | Hirata et al. | 703/8 |
| 2010/0211270 A1* | 8/2010 | Chin et al. | 701/44 |
| 2010/0286899 A1* | 11/2010 | Jain et al. | 701/119 |
| 2010/0293123 A1* | 11/2010 | Barrett et al. | 706/13 |
| 2011/0071964 A1* | 3/2011 | Horvitz | 706/12 |
| 2011/0112747 A1* | 5/2011 | Downs et al. | 701/118 |
| 2011/0125472 A1* | 5/2011 | Trotta et al. | 703/6 |
| 2011/0125473 A1* | 5/2011 | Trotta et al. | 703/6 |
| 2011/0161261 A1* | 6/2011 | Wu et al. | 706/12 |

OTHER PUBLICATIONS

Han L. et al., "Urban road traffic state detection method combined with support vector machine (SVM) and back propagation (BP) neural network", English translation of CN 102737508 A, published Oct. 17, 2012, pp. 1-19.*

(Continued)

*Primary Examiner* — Stanley K Hill
*Assistant Examiner* — Dave Misir
(74) *Attorney, Agent, or Firm* — Amin, Turocy & Watson, LLP

(57) ABSTRACT

A system and method that facilitates urban traffic state detection based on support vector machine (SVM) and multilayer perceptron (MLP) classifiers is provided. Moreover, the SVM and MLP classifiers are fused into a cascaded two-tier classifier that improves the accuracy of the traffic state classification. To further improve the accuracy, the cascaded two-tier classifier (e.g., MLP-SVM), a single SVM classifier and a single MLP classifier are fused to determine a final decision for a traffic state. In addition, fusion strategies are employed during training and implementation phases to compensate for data acquisition and classification errors caused by noise and/or outliers.

20 Claims, 15 Drawing Sheets

(56) References Cited

OTHER PUBLICATIONS

Han L. et al., "Urban road traffic condition detection method based on voting of network sorter", English translation of CN 102750824 A, filed Jun. 19, 2012, pp. 1-21.*

Han L. et al., "Urban road traffic condition detection method based on neural network classifier cascade fusion", English translation of CN 102750825 A, filed Jun. 19, 2012, pp. 1-19.*

Y. Li, et al. Motor way incident detection using probe vehicles. Proceedings of the ICE-Transport, 2005, 158(1): 11-15.

K.-L. Du, et al. Neural Network in a Softcomputing Framework. Springer, London, 2006.

D.E. Rumelhart, et al. Learning internal representations by error propagation. In: D.E. Rumelhart, J.L. McClelland, Eds., Parallel Distributed Processing: Explorations in the Microstructure of Cognition. vol. I: Foundation. MIT Press, Cambridge, MA, 1986, 318-362.

C.W. Hsu, et al. A comparison of methods for multi-class support vector machines. IEEE Transactions on Neural Network, 2002, 13(2): 415-425.

C.J. Lin. Formulations of support vector machines: a note from an optimization point of view. Neural Computation, 2001, 13(2): 307-317.

* cited by examiner

URBAN TRAFFIC STATE DETECTION BASED ON SUPPORT VECTOR MACHINE AND MULTILAYER PERCEPTRON

TECHNICAL FIELD

The subject disclosure relates to traffic state detection and, more particularly, to urban traffic state detection based on support vector machine and multilayer perceptron.

BACKGROUND

Reliable traffic congestion and traffic accident data is essential for the development of efficient urban traffic operation and management. The adverse effects of traffic incidents can be reduced by implementing automatic traffic state detection. Rapid discrimination of the traffic state plus the use of traffic flow guidance and traffic control can overall minimize adverse effects of traffic congestion in the road network.

Traditionally, traffic data is determined based on an analysis of data collected by various sensor devices installed at fixed locations on a road or installed within a probe vehicle travelling on the road. For example, a traffic incident can be detected using the occupancy data from two adjacent detectors. However, utilization of fixed detectors can be extremely expensive, especially in larger areas. In another example, a freeway traffic incident detection algorithm based on probe vehicles (e.g., vehicles that collect data from a traffic stream to which they belong) can be utilized for detection of the traffic incident. The freeway traffic incident detection algorithm is based on a bivariate analysis model using two variables: the average travel time of probe vehicles, and the difference of travel times between two adjacent time intervals.

To predict highway traffic density, some of the conventional systems utilize a Kalman filtering technique (KFT) that employs linear quadratic estimation to predict traffic density. Further, a few conventional systems employ a panoramic video-based method to detect traffic states, while others utilize a cluster analysis with information received from ground detectors to realize traffic state classification. Furthermore, some other conventional systems also utilize a model of K-nearest neighbors nonparametric regression for traffic state forecasting, wherein the graded traffic state forecasting of different time intervals is carried out using the field traffic flow data. However, these conventional approaches for detection of traffic data and/or classification of traffic states can be time consuming, leading to traffic congestion and/or unsafe driving conditions.

SUMMARY

The following present a simplified summary of the specification in order to provide a basic understanding of some aspects of the specification. This summary is not an extensive overview of the specification. It is intended to neither identify key or critical elements of the specification nor delineate any scope particular embodiments of the specification, or any scope of the claims. Its sole purpose is to present some concepts of the specification in a simplified form as a prelude to the more detailed description that is presented later.

The systems and methods disclosed herein, in one aspect thereof, can facilitate fusion-based traffic state detection. In one aspect, the system can facilitate a fusion of support vector machine (SVM) and multilayer perceptron (MLP) classification algorithms to design a cascaded two-tier classifier. The cascaded two-tier classifier can be utilized to infer a traffic state (e.g., congested, busy, unimpeded) associated with a specified area (e.g., a road, intersection, etc.) during a predefined time interval. Additionally or optionally, the cascaded two-tier classifier can be fused with an SVM classifier and an MLP classifier to generate a new classifier to judge the traffic state that provides improved detection accuracy.

In accordance with another aspect, the system facilitates generation of an SVM-MLP classifier for traffic state detection. Moreover, the system generates training samples of road traffic parameters to train an SVM classifier to distinguish between unimpeded and non-unimpeded states. When training the SVM classifier, the system can define weighting of the input parameters and/or optimize the SVM parameters. Further, the system can employ an MLP classifier to further discriminate samples that are classified as non-unimpeded by the SVM classifier, as busy or congested. The SVM-MLP classifier can effectively improve the detection accuracy of urban traffic state.

Yet another aspect of the disclosed subject matter relates to a method that can be employed to facilitate automatic traffic state detection based on classifier fusion. The method comprises determining traffic parameters based on simulation data, training an SVM classifier and an MLP classifier based on the traffic parameters, and fusing the SVM and MLP classifiers to generate a cascaded two-tier classifier. The classification output from the cascaded two-tier classifier can be utilized to determine a traffic state (e.g., congested, busy, and unimpeded).

The following description and the annexed drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

DETAILED DESCRIPTION

Figure 1:
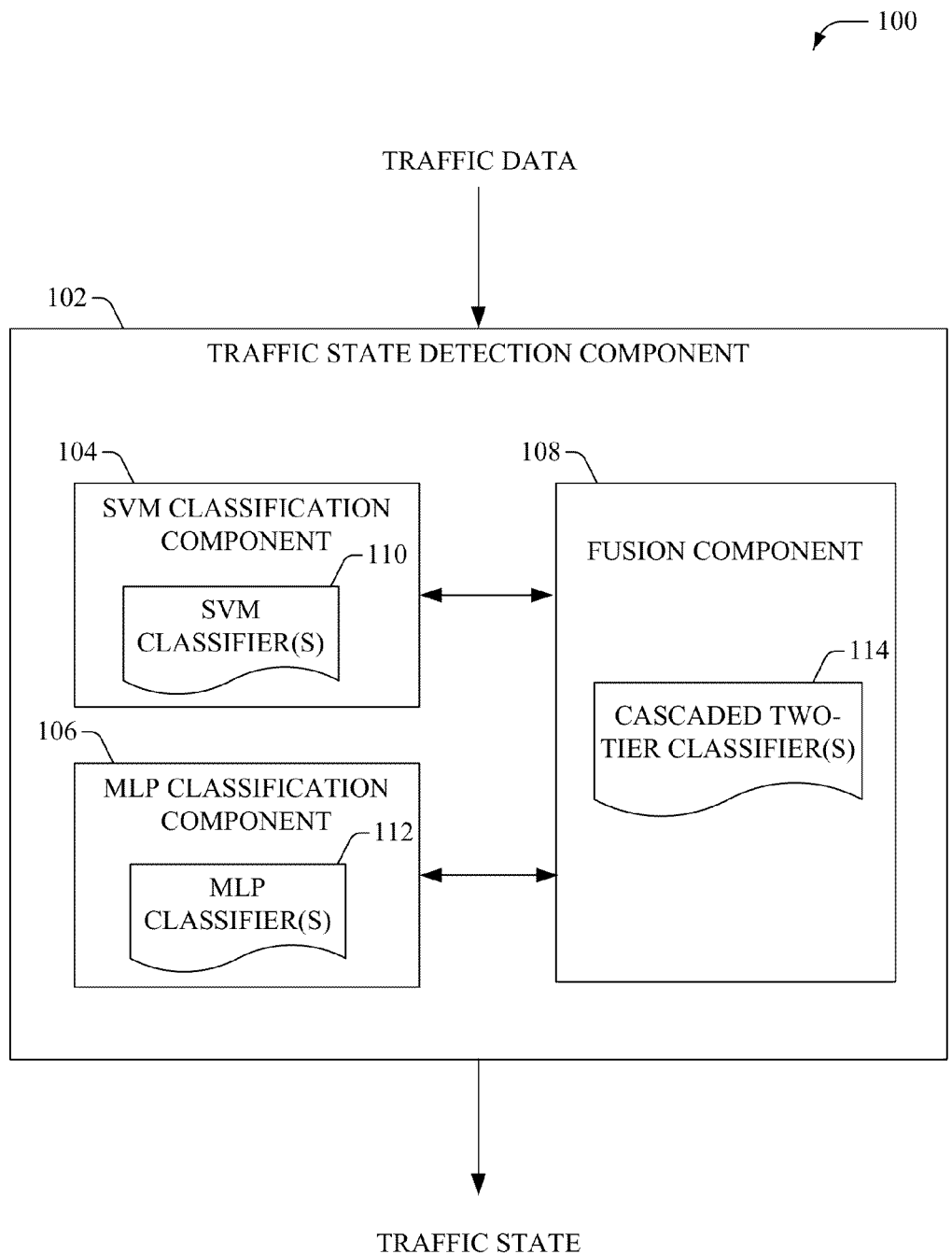
FIG. 1 illustrates an example system that facilitates fusion-based traffic state detection.

One or more embodiments are now described with reference to the drawings, wherein like reference numerals are used to refer to like elements throughout. In the following description, for purposes of explanation, numerous specific details are set forth in order to provide a thorough understanding of the various embodiments. It may be evident, however, that the various embodiments can be practiced without these specific details, e.g., without applying to any particular networked environment or standard. In other instances, well-known structures and devices are shown in block diagram form in order to facilitate describing the embodiments in additional detail.

As used in this application, the terms "component," "module," "system," "interface," "platform," "service," "framework," "connector," "controller," or the like are generally intended to refer to a computer-related entity, either hardware, a combination of hardware and software, software, or software in execution or an entity related to an operational machine with specific functionality(ies). For example, a component may be, but is not limited to being, a process running on a processor, a processor, an object, an executable, a thread of execution, computer-executable instructions, a program, and/or a computer. For instance, both an application running on a controller and the controller can be a component. One or more components may reside within a process and/or thread of execution and a component may be localized on one computer and/or distributed between two or more computers. As another example, an interface can include I/O components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device or computer-readable storage/communications media. For example, computer readable storage media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications can be made to this configuration without departing from the scope or spirit of the various embodiments.

In addition, the words "example" and "exemplary" are used herein to mean serving as an instance, or illustration. Any aspect or design described herein as "example" or "exemplary" is not necessarily to be construed as preferred or advantageous over other aspects or designs. Rather, use of the word example or exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

The systems and methods disclosed herein facilitate traffic state detection based on combining support vector machine (SVM) and multilayer perceptron (MLP) classification. In one aspect, SVM and MLP classifiers can be fused to generate a cascaded two-tier classifier that improves the accuracy of the traffic state classification. Additionally, the cascaded two-tier classifier (e.g., MLP-SVM), SVM classifier and MLP classifier can also be fused to determine a final traffic state to further improve the classification accuracy. As accuracy of the traffic state detection is increased, adverse effects of traffic incidents (e.g., traffic congestion) can be reduced to ensure safe, comfortable driving.

The following description and the annexed drawings set forth certain illustrative aspects of the specification. These aspects are indicative, however, of but a few of the various ways in which the principles of the specification may be employed. Other aspects and embodiments of the specification will become apparent from the following detailed description of the specification when considered in conjunction with the drawings.

Referring initially to FIG. 1, there illustrated is an example system 100 that facilitates traffic state detection, according to an aspect of the subject embodiments. Moreover, system 100 can be deployed to facilitate traffic operation and management, for example, in urban areas. As an example, urban areas include roads that are characteristic of high vehicle density, small spacing between vehicles, low speed of vehicles, and/or a large proportion of traffic congestion sections. According to an aspect, the system 100 includes a traffic state detection component 102 that can identify a state, such as, but not limited to, unimpeded, busy, congested, etc., associated with traffic within a given area (e.g., road, intersection, expressway, etc.) during a specified time period. In one aspect, a traffic state can represent vehicle density, traffic flow characteristics, and/or driving conditions within the given area.

In one aspect, the traffic state detection component 102 can include various classification components, such as, but not limited to a support vector machine (SVM) classification component 104 and/or a multilayer perceptron (MLP) classification component 106. The SVM classification component 104 can categorize a current traffic state based on supervised learning models and learning algorithms that analyze data and identify patterns, to facilitate traffic state classification. As an example, the SVM classification component 104 can employ an SVM classifier 110 to determine a hypersurface in the space of possible inputs, which the hypersurface attempts to split the triggering criteria from the non-triggering events. Intuitively, this makes the classification correct for testing data that is near, but not identical to training data.

Further, the MLP classification component 106 can employ an artificial neural network model that maps sets of input data onto a set of appropriate output to facilitate traffic state classification. In one example, the MLP classification component 106 can utilize an MLP classifier 112 that employs supervised learning techniques such as, but not limited to, backpropagation for training the neural network. It can be noted that the traffic state detection component 102 is not limited to employing SVM and MLP classifiers and other directed and undirected model classification approaches including, e.g., naïve Bayes, Bayesian networks, decision trees, neural networks, fuzzy logic models, and probabilistic classification models providing different patterns of independence can also be employed. Classification as used herein also is inclusive of statistical regression that is utilized to develop models of priority.

The fusion component 108 can facilitate a fusion of SVM and MLP classifiers (e.g., utilized by the SVM classification component 104 and MLP classification component 106 respectively) to design a cascaded two-tier classifier 114. Further, the fusion component 108 can fuse the cascaded two-tier classifier 114, the SVM classifier 110, and the MLP classifier 112 to generate a new classifier to infer the traffic state. In one example, the SVM classification component 104 is trained to distinguish between unimpeded and non-unimpeded states, for example, by utilizing training samples of urban road traffic parameters. During the training, weighting of input parameters (e.g., average vehicle speed, traffic volume, time occupancy of vehicle, and average travel time) can be set and SVM parameters can be optimized as described in detail infra with respect to FIGS. 3A-3E. In one aspect, the SVM classification component 104 can be utilized to separate samples of unimpeded state, and the MLP classification component 106 can be utilized to further discriminate those samples, that are classified as non-unimpeded by the SVM classification component 104, as busy or congested. In addition, traffic state detection component 102 can apply weighted voting of the cascaded two-tier classifier 114, the SVM classifier 110, and the MLP classifier 112 to generate a final traffic state with improved accuracy. As an example, the detected traffic state can be utilized by various traffic guidance, control, and/or management systems (e.g., traffic light controls). Additionally or alternatively, notification and/or alert data indicative of the detected traffic state can be delivered to an operator device via transmission of a communication message (e.g., text message, email, etc.), for example, if the traffic state satisfies an alert criterion.

Figure 2:
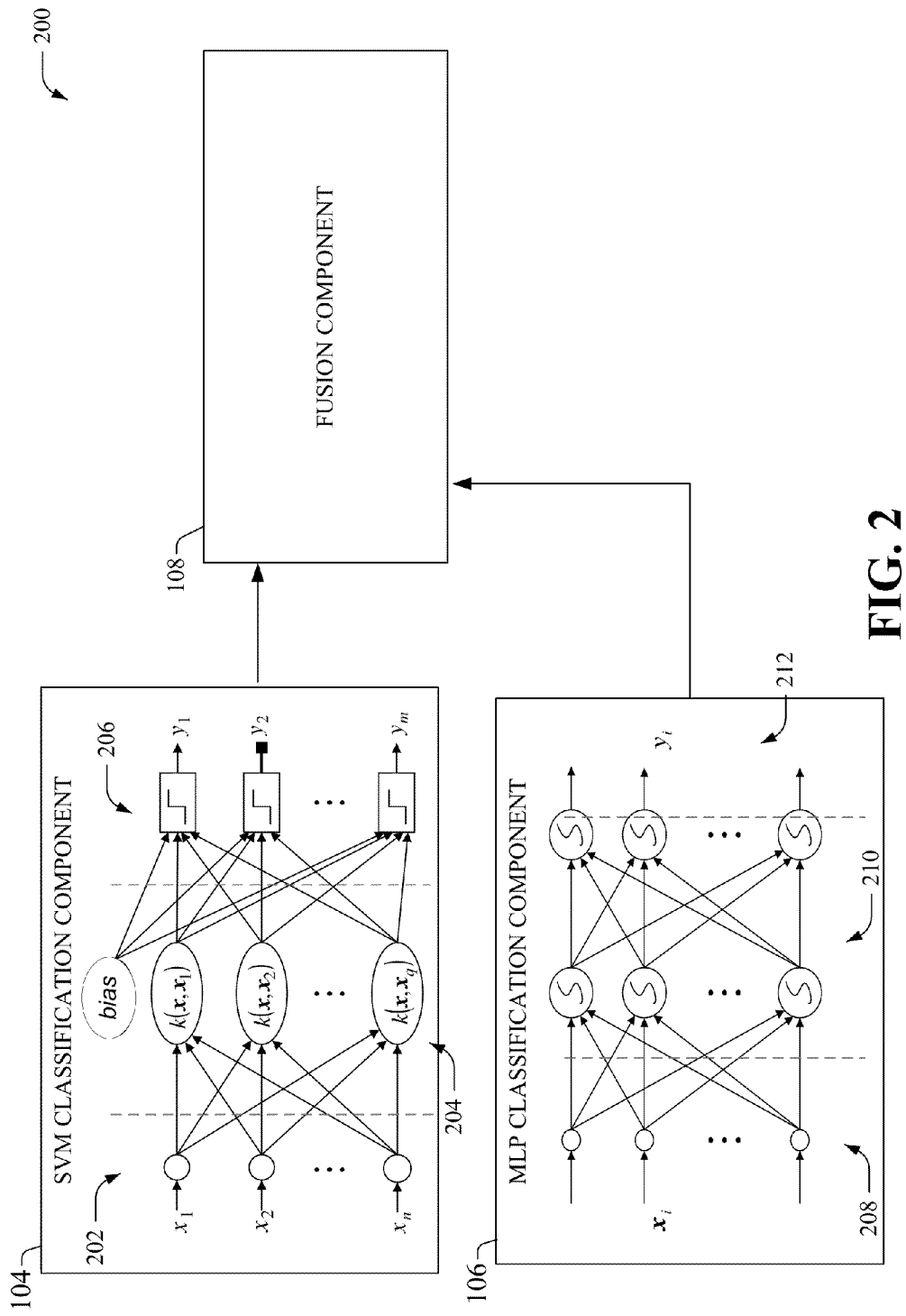
FIG. 2 illustrates an example system that depicts classifier architectures for fusion-based state detection.

Referring now to FIG. 2, there illustrated is an example system 200 that depicts classifier architectures in accordance with an aspect of the subject disclosure. It can be noted that the SVM classification component 104, the MLP classification component 106, and fusion component 108 can include functionality, as more fully described herein, for example, with regard to system 100. The SVM classification component 104 can facilitate automatically inferring a traffic state associated with traffic within a given area during a given time period. In one aspect, the SVM classification component 104 utilizes an SVM classifier 110 that can determine a classification hyperplane as a decision-making surface, which maximizes the margin between the edge of the positive and negative examples. Based on statistical learning theory, the SVM classifier 110 approximately approaches structural risk minimization. This principle is based on the fact that the generalization error of the test data from learning machine relies on the sum of the training error and a term depending on the Vapnik-Chervonenkis (VC) dimension as boundary; in the case of separable mode, the first term is zero and the second term is minimized.

The concept of the inner product kernel is the key to the SVM classification. The inner product kernel is the relationship between an input vector x and support vectors $x_i$ (wherein i is a natural number). The support vector set is a subset extracted from training data by the algorithm utilized by the SVM classification component 104. Moreover, the SVM classification component 104 can determine a model from the training data, which predicts the target values of the test data. In one aspect, the SVM classifier architecture employed by the SVM classification component 104 can include four basic kernel functions:

Linear kernel: $k(x,x_i)=x^T x_i$;

Polynomial kernel: $k(x,x_i)=(\gamma x^T x_i + r)^p, \gamma > 0$;

Gaussian kernel: $k(x,x_i)=\exp(-\gamma \|x-x_i\|^2), \gamma > 0$; and

Sigmoidal perceptron kernel: $k(x,x_i)=\tan h(\gamma x^T x_i + r)$.

As an example, the SVM classifier architecture includes as a feed-forward neural network with an input layer 202, a single hidden layer 204, and an output layer 206.

Further, in one aspect, the SVM classification component 104 can employ a statistical analysis method, such as cross-validation, to verify the performance of the SVM classifier. For example, the SVM classification component 104 can divide the traffic data into a training set and a test set, employ the training set to train the SVM classifier, and then employ the test set to evaluate the SVM classifier performance. As an example, the SVM classification component 104 can perform multiclass SVM classification based on multiple binary SVM classifiers, using a one-against-all strategy and/or a one-against-one strategy. For the one-against-all strategy for M-class (wherein M is a natural number greater than 2) classification, each class is trained against the union of the remaining M−1 classes. For the $j^{th}$ (wherein j is a natural number) two-class problem, the original M-class training data are labeled as belonging to class j or not and are used for training. Thus, a total of M binary SVM classifiers are required. Each classifier has to be trained on the entire training set, and there is no guarantee that good discrimination exists between one class and the remaining classes. In the one-against-one strategy, the decision functions for all the combinations of class pairs is determined. When determining a decision function for a class pair, training data for the corresponding two classes can be utilized. Thus, in each training session, the number of training data is reduced considerably. The one-against-one strategy trains $M(M−1)/2$ binary SVM classifiers, compared to M binary SVM classifiers for the one-against-all strategy, and each classifier separates a pair of classes. Outputs of $M(M−1)/2$ times binary tests are required to make a final classification decision with majority voting, leading to prohibitive computation for large M. The one-against-one strategy reduces the size of the unclassifiable regions that occur for the one-against-all strategy.

Referring back to FIG. 2, the MLP classification component 106 can utilize a multilayer feedforward network trained by an error-backpropagation algorithm to facilitate traffic state detection. Typically, the MLP classification component 106 can utilize most any algorithm for parameter adaptation, including (but not limited to) gradient descent algorithms. In one example, the MLP classification component 106 can employ a three-layer MLP neural network that has a universal approximation capability. The three-layer MLP neural network employs the steepest descent method and backpropagation to adjust the network weights and node thresholds to minimize the error sum of squares of the neural network. The MLP model has an input layer 208, one or more hidden layers 210 and an output layer 212. Given input learning samples $x_1, x_2, \ldots, x_q$ and their corresponding output samples $y_1, y_2, \ldots, y_q$, (wherein q is a natural number), the MLP classification component 106 can minimize the sum of squared error between the actual output and target output of the network to adjust the network weights.

Further, the fusion component 108 can utilize various classifier fusion techniques to combine the SVM and MLP classifiers. In one example, the fusion component 108 can utilize a Dempster-Shafer (D-S) theory of evidence, wherein an evidence set is divided into two or more unrelated parts, and to use the classification framework to judge them, and then to combine them using the D-S rule. Data fusion at different levels corresponds to different algorithms. The D-S theory of evidence is an inexact reasoning method suitable for a multi-sensor target recognition in the decision-making data fusion. In one aspect, the fusion component 108 can facilitate classifier fusion utilizing D-S theory of evidence as follows.

Let Θ be a finite non-empty set of N exhaustive and mutually exclusive hypotheses about a problem domain, Θ={$A_1$, $A_2, \ldots, A_N\}$, (wherein N is a natural number) called the frame of discernment. All subsets are denoted as $2^\Theta$. The mass function m: $2^\Theta \rightarrow [0,1]$ satisfies the following conditions:

(1) An unlikely event has a probability of 0, that is, m(∅)= 0.

(2) $\Sigma_{A \subset \Theta} m(A) = 1$, i.e., the sum of the basic probabilities of all the elements is 1. m(A) is called basic probability assignment of A. A is a subset of the frame of discernment. If m(A)>0, A is called a focal element.

The belief function Bel(A) is defined as the sum of corresponding basic probabilities of all subsets:

$$Bel(A) = \Sigma_{B \subseteq A} m(B), \forall A \subseteq \Theta \quad (1)$$

The belief function, also known as the lower limit function, indicates that A is the lowest belief. Bel(∅)=0, Bel(Θ)=1.

A plausibility function is defined as:

$$Pl(A) = 1 - Bel(\overline{A}) = \Sigma_{B \cap A \neq \emptyset} m(B), \forall A \subseteq \Theta \quad (2)$$

The plausibility function, also known as the upper limit function, expresses the greatest potential belief degree in A. The relationship between the belief function and plausibility function is given by:

$$Pl(A) \geq Bel(A). \quad (3)$$

The fusion component 108 can employ a D-S rule of aggregation, also known as the rule of orthogonal summing to facilitate classifier fusion. The D-S rule of aggregation facilitates obtaining a new basic probability assignment output based on synthesizing the basic probability assignments from multiple sources. Further, the basic probability assignment can be obtained based on testing on the test set. In the frame of discernment Θ, assuming that $m_1$ and $m_2$ are the basic probability assignments from different information sources:

$$m(\emptyset) = 0, m(A) \quad (4)$$
$$= m_1 \oplus m_2$$
$$= \frac{1}{1-K} \sum_{B \cap C = A} m_1(B) m_2(C),$$

$$K = \sum_{B \cap C = \emptyset} m_1(B) m_2(C) > 0, \quad (5)$$

where K is the coefficient of the level of confliction. If K≠1, a basic probability assignment is determined; if K=1, then $m_1$ and $m_2$ contradict and cannot be aggregated on the basic probability assignments. In the same frame of discernment Θ, the aggregation of n (wherein n is a positive natural number) different sources of information $(m_1, m_2, \ldots, m_n)$ yields the basic probability assignment $m = m_1 \oplus m_2 \oplus \ldots \oplus m_n$, that is:

$$m(A) = \frac{1}{1-K} \sum_{\cap A_i = A} \left( \prod_{i=1}^{n} m(A_i) \right), \quad (6)$$

$$K = \sum_{\cap A_i = \emptyset} \left( \prod_{i=1}^{n} m(A_i) \right). \quad (7)$$

Figure 3A:
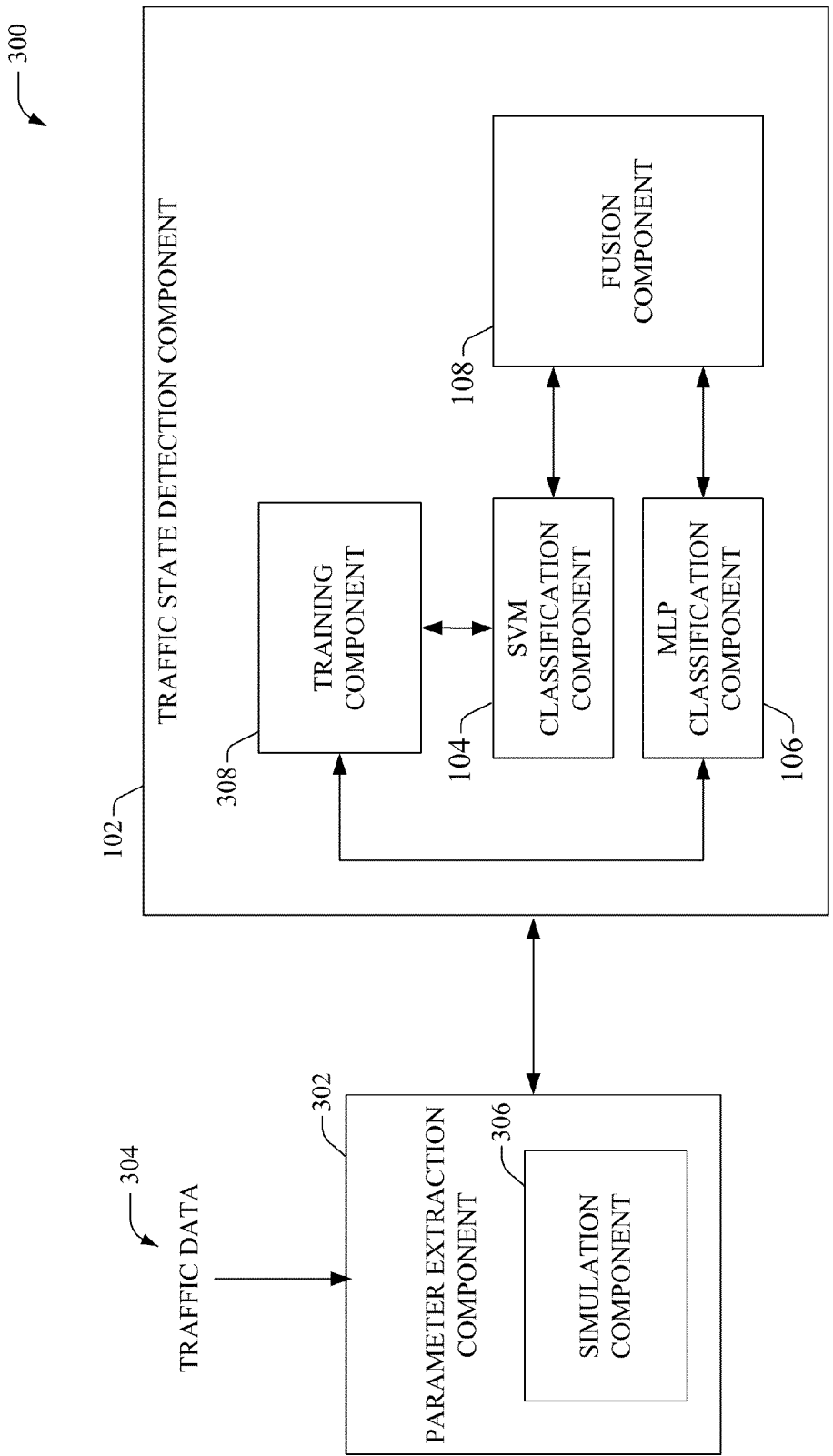
FIGS. 3A-3E illustrate an example system that facilitates training and testing a traffic state detection classifier, and simulation and/or sample distribution data generated during the training.

Referring now to FIG. 3A, there illustrated is an example system 300 that facilitates training and testing of a traffic state detection classifier, according to an aspect of the subject embodiments. In one aspect, system 300 collects various input parameters and trains the SVM and MLP classifiers utilized by the SVM classification component 104 and the MLP classification component 106 respectively to facilitate fusion-based traffic state detection. It can be noted that the traffic state detection component 102, SVM classification component 104, MLP classification component 106, and fusion component 108, can include functionality, as more fully described herein, for example, with regard to systems 100-200.

According to an aspect, system 300 can include a parameter extraction component 302 that facilitates traffic data collection and/or determination of traffic parameters. As an example, the parameter extraction component 302 can determine fixed factors and random factors associated with a given area (e.g., a road, an intersection, a ramp, etc.) based on received traffic data 304. Fixed factors can include factors associated with the area, such as, but not limited to, the instant, lane conditions, traffic lights, roads, etc. Further, random factors can include factors such as, but not limited to, change in the weather and/or accidents. These factors are typically reflected in the change of vehicle speed and/or traffic volume.

In one aspect, the traffic data 304 can be collected (e.g., by the parameter extraction component 302) based on most any detection technique. For example, the traffic data 304 can be determined based on ultrasonic detection, infrared detection, ground detection, and/or computer vision. Ultrasonic is suitable for short detection distance (e.g., less than 12 m) since detection can be blocked by vehicles and pedestrians and thus, the accuracy is not high. Infrared detection is affected by the heat source of the vehicle itself, and has low anti-noise capability and low detection accuracy. Ground detection has a high accuracy, but it requires burying the equipment into the lanes, causing damages to the road and inconvenient installation. Computer vision based detection, which continues to evolve with computer technology, image processing, artificial intelligence, and pattern recognition, can also be deployed in the detection of traffic flow. Further, traffic data 304 can be determined based on microwave data (e.g., collected by microwave radars) and/or video data (e.g., collected by video cameras) of an area. According to an aspect, the parameter extraction component 302 can simulate traffic (e.g., vehicle and/or pedestrian) within the area for a specified time period (e.g., during a day) for each traffic state to evaluate traffic state for each sample by employing the simulation component 306. Thus, the simulation component 306 can obtain a large number of samples for traffic state detection. As an example, microscopic multi-modal traffic flow simulation system (e.g., VISSIM®) can be utilized to facilitate the traffic flow simulation. Although the simulation component 306 is depicted to reside within the parameter extraction component 302 in FIG. 3A, it can be appreciated that the simulation component 306 can also be coupled to the parameter extraction component 302 via a communication interface.

In one example, the simulation component 306 can include a traffic simulator and a signal state generator. Moreover, the simulation component 306 can include a car following model and a lane transformation model. The signal state generator is a signal control program that can continuously obtain detection information from the traffic simulator based on the simulation step, to decide the signal state of the next simulation instant, and transmit this information to the traffic simulator. The simulation component 306 can analyze traffic operation under a wide range of conditions such as (but not limited to) the types of lanes, traffic composition, traffic signal control, and/or stop/yield control. Moreover, the simulation component 306 not only simulates real-time operation of transportation infrastructure, but can also output various traffic parameters, such as travel time and queue length. The results generated by the simulation component 306 reflect the actual traffic conditions by setting the corresponding parameters. Therefore, the simulation data obtained is closer to the actual data observed.

In addition, traffic simulation can facilitate customization of samples based on location characteristics and/or geographical trends. For example, a simulation system can employ microwave data of Hangzhou Stadium Road to Fengqi Road (north to south) in Hangzhou City, to simulate the intersection throughout the day for each traffic state to evaluate traffic state for each sample. A data set of 3170 samples for traffic state detection can thus obtained. Compared to existing datasets (e.g., I-880 data: San Francisco, Calif., USA I-880 highway traffic data), the simulated data has more practical significance for Chinese urban transportation.

Figure 3B:
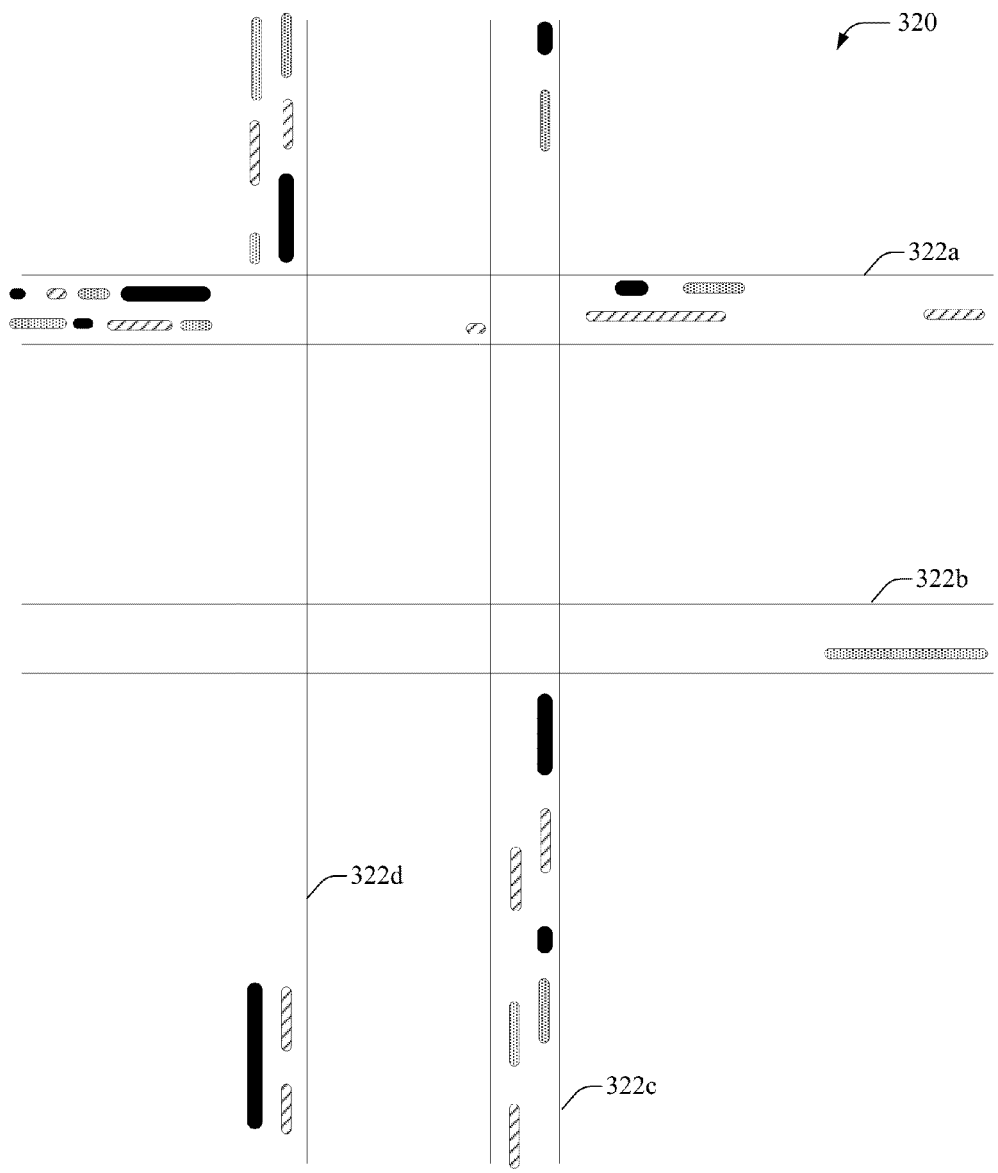

FIG. 3B depicts an example simulation environment 320 generated by the simulation component 306. As an example, the simulation environment 320 illustrates traffic data associated with four roads (322a-322d). In one aspect, the simulation environment 320 displays an environment of the vehicles (e.g., depicted by the different blocks) on the roads (322a-322d) during a specified time period (e.g., 24 hour time period, rush hour, etc.). It can be noted that the subject system is not limited to generating and/or displaying the simulation environment 320 with four roads (322a-322d) and that a simulation environment for most any number of roads, intersections, roundabouts, areas, can be generated and/or displayed (e.g., by the simulation component 306).

Referring back to FIG. 3A, based on the traffic data 304 and/or the simulation data (e.g., determined by simulation component 306), the parameter extraction component 302 can determine traffic parameters including, but not limited to, the average vehicle speed, traffic volume and vehicle time occupancy. As an example, traffic parameters, such as average vehicle speed v (m/s), traffic volume f (veh/s), time occupancy s, travel time t (s), are defined as:

$$v = \frac{\sum_{i=1}^{n_\tau} v_i}{n_\tau}, \quad (8)$$

$$f = \frac{n_\tau}{\tau}, \quad (9)$$

$$s = \frac{t_2 - t_1}{\tau}, \quad (10)$$

$$t = t_2 - t_1, \quad (11)$$

where $v_i$ (wherein i=1, 2, ... $n_\tau$,) is the speed of each vehicle passing a cross-section, $\tau$ is the data collection interval, $n_\tau$ is the total number of the vehicles that pass a cross-section during the time interval $\tau$, $t_1$ is the instant when the vehicle starts to enter a specified section, and $t_2$ is the instant when the vehicle completely leaves the section. Equation (8) represents the average speed measured at specified time intervals at fixed place. Equation (9) represents the number of vehicles through the sections in unit time. Further, equation (10) provides the ratio of the time that a vehicle spends to pass the road section with respect to the time interval. Furthermore, equation (11) defines the travel time for a vehicle to pass a road section, including travel time and delay time.

Based on an analysis of the traffic parameters, the traffic state detection component 102 can determine a current traffic state. As an example, road traffic can be classified into different states such as (but not limited to) unimpeded, busy, and congested. The unimpeded state can correspond to the highest level of service, while the congested state can correspond to the lowest level of service. In one aspect, the traffic state detection component 102 can detect an unimpeded state when the traffic is in the range of free flow and steady flow. For example, each vehicle is independent of other vehicles in a traffic stream and has a high degree of freedom (e.g., above a predefined criterion) to select the desired speed. Further, the traffic state detection component 102 can detect a busy state, when the traffic is still within steady flow range, however the interaction between vehicles is larger and/or the speed of a vehicle is constrained by other vehicles. There is a significant decline in the degree of comfort and convenience of driving during the busy state. Furthermore, the traffic state detection component 102 can detect a congested state when the traffic ranges from a steady flow to an unstable flow. The speed and freedom of driving are subject to strict constraints during the congested state. For example, during a congested state very long queues of vehicles can be observed at signalized intersections and/or a small increase in the traffic volume can cause congestion problems. When the traffic volume of a section exceeds the capacity of the section, traffic congestion arises. At this point, the queue stays stagnant. This causes a long delay at intersections, and some vehicles even have to wait for two signal cycles to pass the intersection.

Figure 3C:
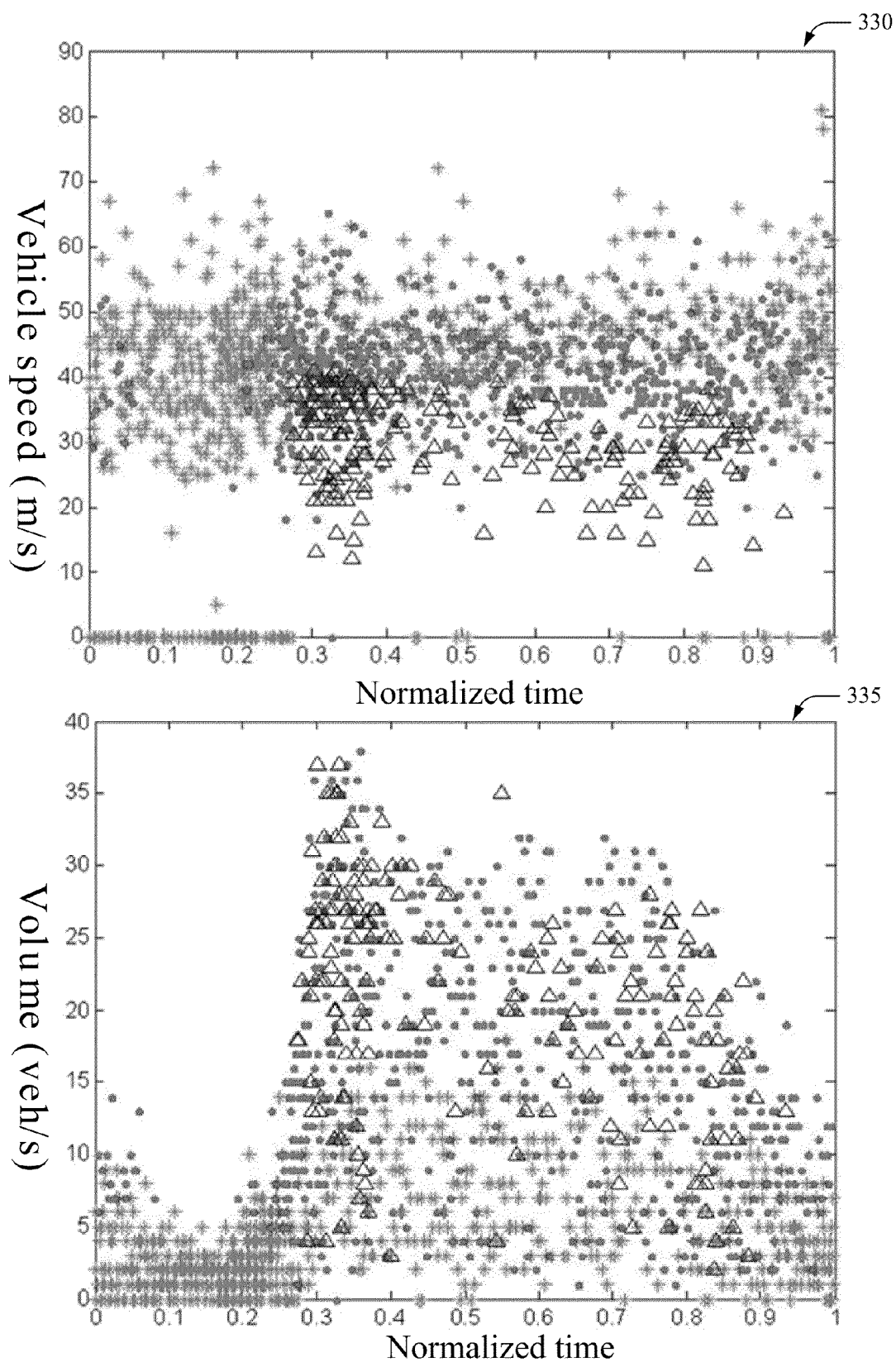
Figure 3D:
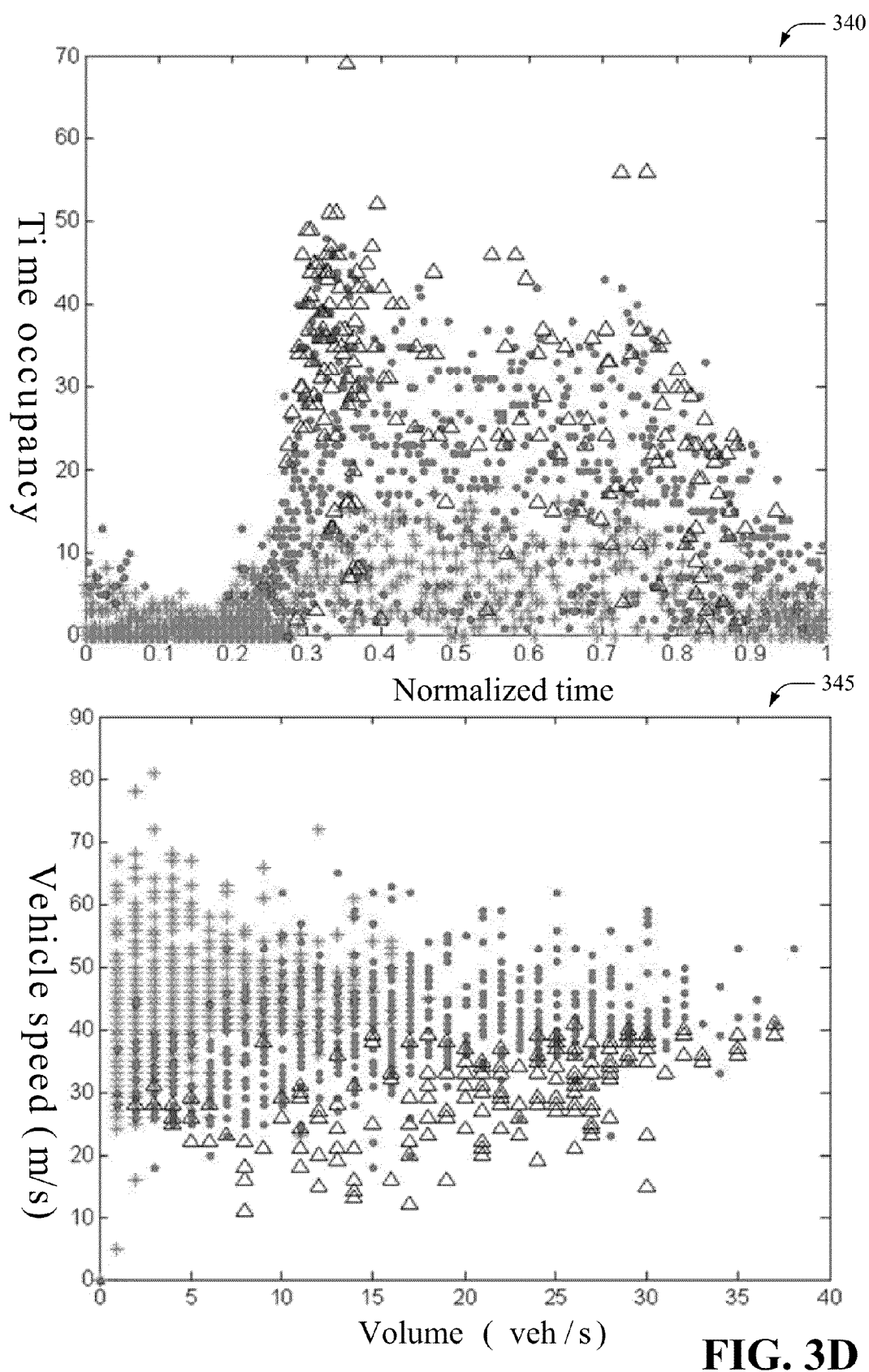
Figure 3E:
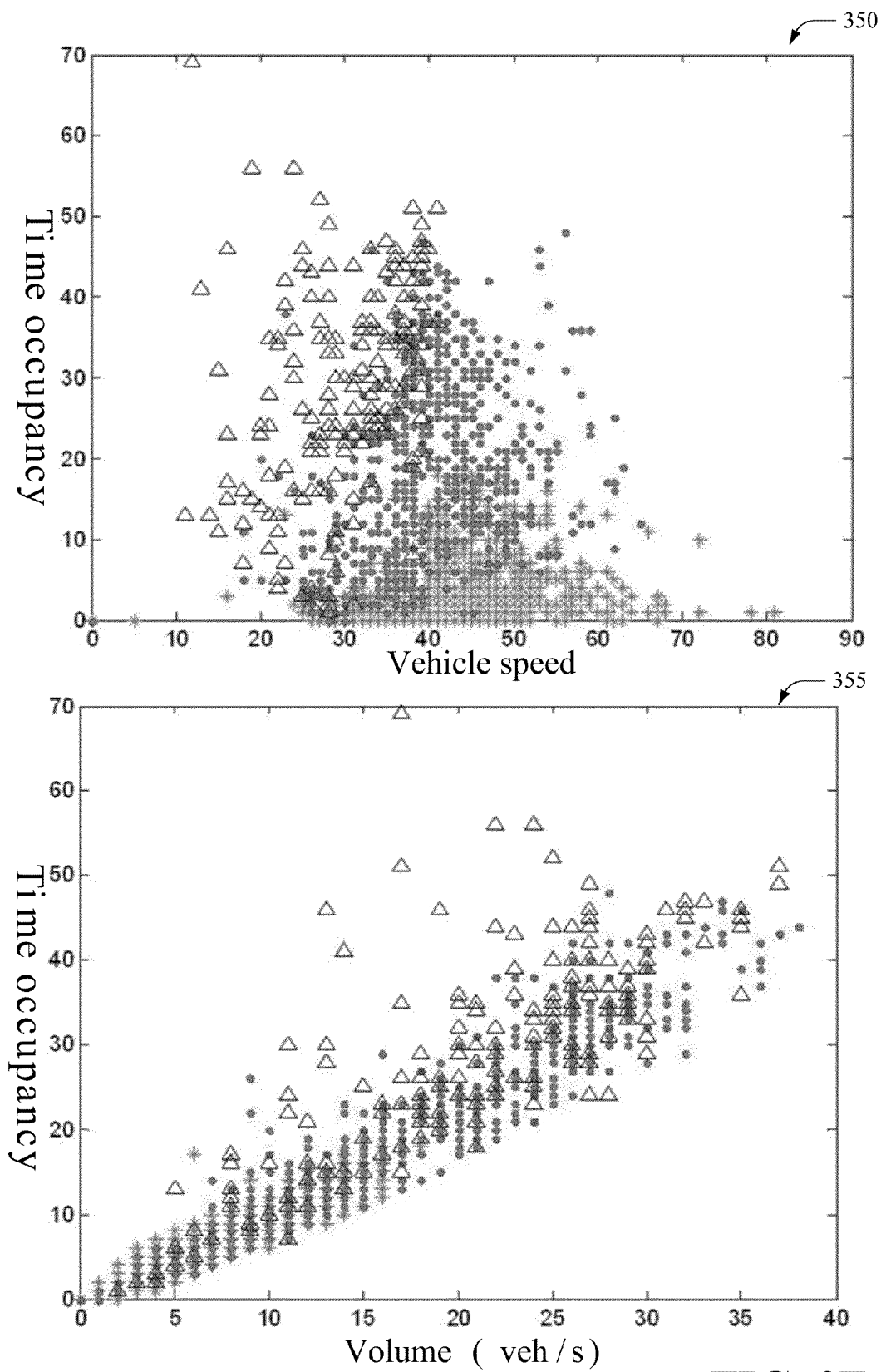

Further, FIGS. 3C-3E illustrate example graphs 330-355 that depict a distribution of the traffic data samples. In one aspect, the parameter extraction component 302 can analyze the simulation environment 320 to determine the distribution of the traffic data samples. For example, the traffic data samples can be distributed based on vehicle speed vs. normalized time and/or vehicle volume vs. normalized time, as depicted in FIG. 3C; time occupancy vs. normalized time and/or vehicle volume vs. vehicle volume, as depicted in FIG. 3D; and/or time occupancy vs. vehicle speed and/or time occupancy vs. vehicle volume, as depicted in FIG. 3E. As an example, "*" represents a traffic data sample in an unimpeded state, "•" represents a traffic data sample in the busy state, and "Δ" represents a traffic data sample in the congested state.

Referring back to FIG. 3A, to facilitate automatic traffic state detection, the classifiers employed by the SVM classification component 104 and the MLP classification component 106 are trained, for example, by training component 308. In one example, the training component 308 can utilize sample/training data identified based on a simulation data that displays the environment of the vehicles on a road (e.g., simulation environment 320). The simulation data provides results that more accurately represent the actual traffic state, as compared to other methods such as a method that identifies a congested state based on whether the average vehicle speed is below a threshold (e.g., 20 km/hour). Continuing with the above noted example, wherein a data set of 3170 samples for traffic state detection is obtained, the data set can include a training set comprising 1730 data samples, composed of 878 unimpeded, 669 busy, and 183 congested samples; and a test set comprising 1440 data samples, composed of 740 unimpeded, 565 busy, 135 congested samples. Thus, by utilizing simulation data, the parameter extraction component 302 can generate a large number of samples compared to conventional systems. According to an aspect, the training component 308 can preprocess the traffic states and the traffic parameters (e.g., average vehicle speed, traffic volume, time occupancy of vehicle, average travel time) of the samples and utilize the preprocessed training set to train SVM classifier employed by the SVM classification component 104.

In one aspect, the training component 308 can then evaluate the trained SVM classifier by using a test set. For example, the training component 308 can utilize a library for support vector machines (LIBSVM) system to train and/or test the sample set. Moreover, the training component 308 can normalize the four input traffic parameters: average vehicle speed, traffic volume, time occupancy of vehicle, and average travel time; train the SVM classifier after normalizing the training set, and then employ cross-validation to determine the optimal values of parameters C, γ. Polynomial, Gaussian and sigmoidal kernel functions have the parameter γ. The penalty parameter C>0. A larger C implies a less emphasis on the outliers. As an example, the SVM classifier can be utilized with various kernels, for example, linear, polynomial, Gaussian, and/or sigmoidal kernel functions, with or without optimization of parameters, on the training and test set. By using cross-validation for parameter optimization of different SVM models and the kernel functions, optimal classification results with a set of parameters can be determined. Example results from an experiment of the trained SVM classifier on the test set conducted by the training component 308 are shown below in Table 1.

TABLE 1

| Kernel | Optimization with cross-validation | Parameters C/γ | Classification accuracy | The number of support vectors | Mean detection time (s) |
|---|---|---|---|---|---|
| Linear | No | — | 80.0694% | 873 | 0.07661 |
|  | Yes | 32/— | 80.9028% | 734 | 0.05587 |
| Polynomial | No | — | 72.5% | 1308 | 0.11962 |
|  | Yes | 8/16 | 83.5417% | 619 | 10.6852 |
| Gaussian radial basis | No | — | 78.125% | 943 | 0.05699 |
|  | Yes | 32/8 | 85.1389% | 469 | 0.11799 |
| Sigmoidal | No | — | 75.9028% | 997 | 0.22872 |
|  | Yes | 8/16 | 39.7222% | 1366 | 0.35228 |

Based at least on the above results, it can be determined that the Gaussian kernel yields good detection performance when the parameters are optimized by cross-validation. The Gaussian kernel can be determined as:

$$k(x, x_i) = 32 \cdot \exp(-8 \|x - x_i\|^2), \quad (12)$$

where x is a 4-dimension support vector. As seen from Table 1, for the learnt classifier, 469 support vectors are generated.

In addition, the training component 308 can train and test the MLP classifier employed by the MLP classification component 106. In one aspect, the training component 308 can normalize the traffic data set and train the MLP classifier with the normalized training set. As an example, a three-layer MLP classifier can be utilized, wherein the input layer can have four nodes for the four traffic parameters (e.g., average vehicle speed, traffic volume, time occupancy of vehicle, and average travel time). The hidden layer can have twelve nodes and the output layer can have three nodes, representing three traffic states (e.g., unimpeded, busy and congested). The sigmoidal function can be utilized in the neurons of the hidden and output layers. Further, the MLP classifier can be utilized to evaluate the classification accuracy on the test set.

According to an aspect, fusion of multiple classifiers with different training set or at multiple instants in a short period of time can further improve the detection accuracy. During a training phase (e.g., when classifier are being trained), the training component 308 can train multiple classifiers with different training sets, and the fusion component can fuse the classifier to generate a cascaded classifier. As an example, a high performance classifier (e.g., Gaussian kernel based SVM classifier or cascaded two-tier classifier MLP-SVM) can be selected as a first base classifier and the training component 308 can train the first base classifier using the entire data set (e.g., simulation data). In one aspect, the data set can be divided into eight partitions, denoted $R_i$, i=1, 2, . . . , 8. Further, the first base classifier can be employed (e.g., by the training component 308) to test $R_1$, pick out the incorrectly detected samples, and denote them as $W_1$. Furthermore, a second base classifier with a training set composed of $W_1$ and $R_2$ can be selected and employed (e.g., by the training component 308) to test $W_1$ and $R_2$, pick out the incorrectly detected samples and denote them as $W_2$. Similarly, a third base classifier can be selected and employed (e.g., by the training component 308) to test $W_2$ and $R_3$, pick out the incorrectly detected samples and denote them as $W_3$, so on and so forth, until eight base classifiers are trained. In one aspect, the fusion component 108 can be utilized to fuse the eight base classifiers based on ensemble learning. This method can enhance the classification ability of the classifier, and improve the classification accuracy.

During an implementation phase (e.g., subsequent to the training phase), the fusion component 108 can fuse the detection results of a base classifier at multiple consecutive time instants, and determine the final detection decision. For example, if the urban road traffic state is released at one-minute intervals and data samples are recorded every minute, the traffic state detection component 102 can create an SVM, MLP-SVM or any three-class classifier as a base classifier, classify the state at each minute for the samples obtained at the first four minutes and record the classification results. The results can be released as the final classification decisions (e.g., by the traffic state detection component 102). After determining the classification decisions of the first five minutes, the five classification decisions are voted for based on ensemble learning theory. A new decision is obtained and released as the final decision at the fifth minute (e.g., by the traffic state detection component 102). From the sixth minute on, after having the classification result of the $m^{th}$ minute (m>5), the fusion component 108 can fuse the decisions at minute m−4, m−3, m−2, m−1, m to get a final classification decision at minute m. Typically, there can be errors during the parameters of urban road traffic data collection in the real situation. However, the above noted fusion algorithm (e.g., utilized by fusion component 108) can effectively reduce the inaccurate data due to data acquisition and classification errors caused by noise and outliers and greatly improve the classification accuracy.

Figure 4A:
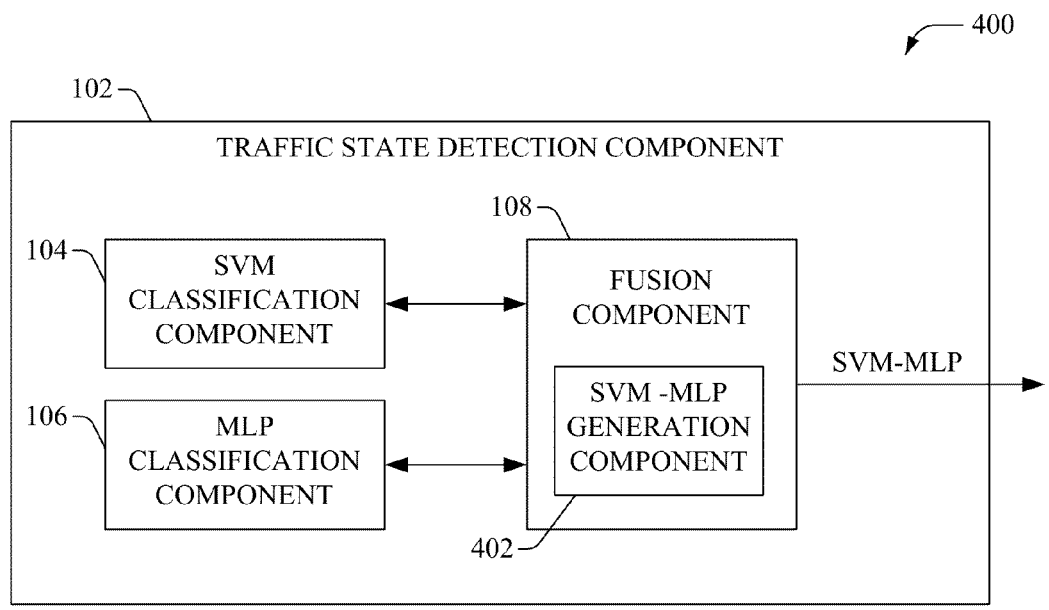
FIGS. 4A-4D illustrate example systems for generation of a cascaded two-tier classifier.

Referring now to FIG. 4A there illustrated is an example system 400 that generates an SVM-MLP classifier in accordance with an aspect of the subject disclosure. It can be noted that the traffic state detection component 102, SVM classification component 104, MLP classification component 106, and fusion component 108 can include functionality, as more fully described herein, for example, with regard to systems 100-300.

Typically, in terms of accuracy, the SVM classifier (e.g., employed by the SVM classification component 104) is better (e.g., more accurate) than the MLP classifier (e.g., employed by the MLP classification component 106) for discriminating the unimpeded state, and the MLP classifier is better (e.g., more accurate) than the SVM classifier for discriminating the congested state. Thus, the fusion component 108 can employ an SVM-MLP generation component 402 to facilitate generation of a cascaded two-tier classifier, wherein first tier is discriminates an unimpeded state from the sample set, by employing the SVM classifier (e.g., utilized by the SVM classification component 104), and the second tier discriminates a sample that is classified as non-unimpeded by the SVM, as busy or congested state, by employing the MLP classifier (e.g., utilized by the MLP classification component 106).

As an example, the SVM classifier can be a binary classifier that determines whether the state of a sample is unimpeded or not. Based on the results from the SVM classification component 104, if determined that the sample is in a non-unimpeded state, the SVM-MLP generation component 402, provides the sample to the MLP classification component 106 that employs a binary MLP classifier to classify the non-unimpeded state as busy or congested. Accordingly, the SVM-MLP generation component 402 employs the SVM classifier to separate the unimpeded state from the test set and the MLP classifier to distinguish the non-unimpeded samples classified by the SVM classifier as busy or congested state.

Figure 4B:
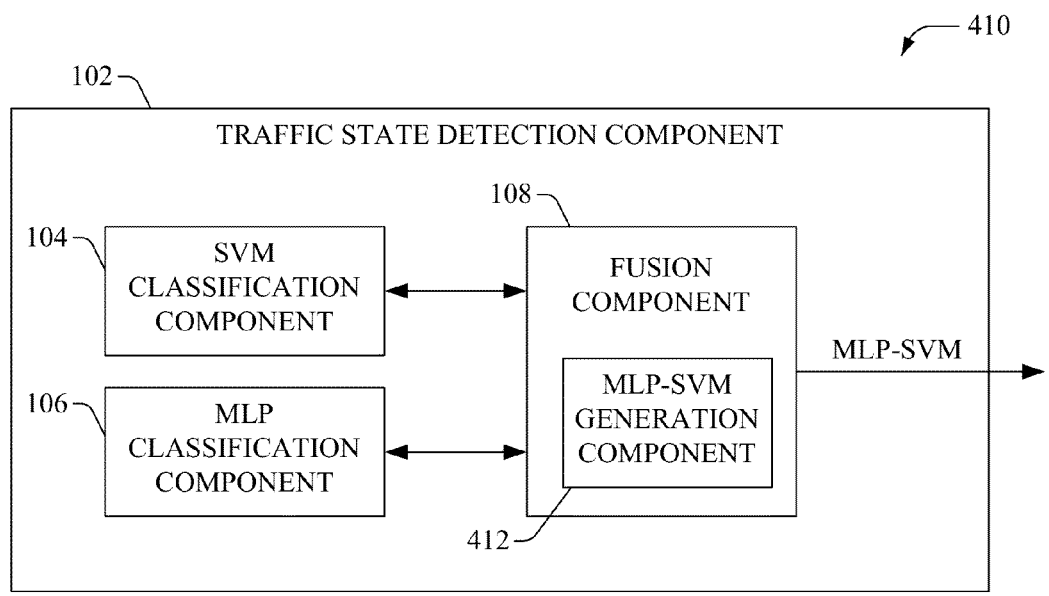

FIG. 4B illustrates is an example system 410 that generates an MLP-SVM classifier in accordance with an aspect of the subject disclosure. It can be noted that the traffic state detection component 102, SVM classification component 104, MLP classification component 106, and fusion component 108 can include functionality, as more fully described herein, for example, with regard to systems 100-300.

In one aspect, the fusion component 108 can employ an MLP-SVM generation component 412 to facilitate generation of a cascaded two-tier classifier, wherein the first tier discriminates congested state from the sample set, by employing the MLP classifier (e.g., utilized by the MLP classification component 106), and the second tier discriminates a sample that is classified as non-congested by the MLP, as busy or unimpeded, by employing the SVM classifier (e.g., utilized by the SVM classification component 104).

As an example, the MLP classifier can be a binary classifier that determines whether the state of a sample is congested or non-congested. Based on the results from the MLP classification component 106, if determined that the sample is in a non-congested state, the MLP-SVM generation component 412, provides the sample to the SVM classification component 104 that employs a binary SVM classifier to classify the sample having a non-congested state as busy or unimpeded. Accordingly, the SVM-MLP generation component 402 employs the MLP classifier to separate the congested state from the test set and the SVM classifier to distinguish the non-congested samples classified by the MLP classifier as having a busy or unimpeded state.

Figure 4C:
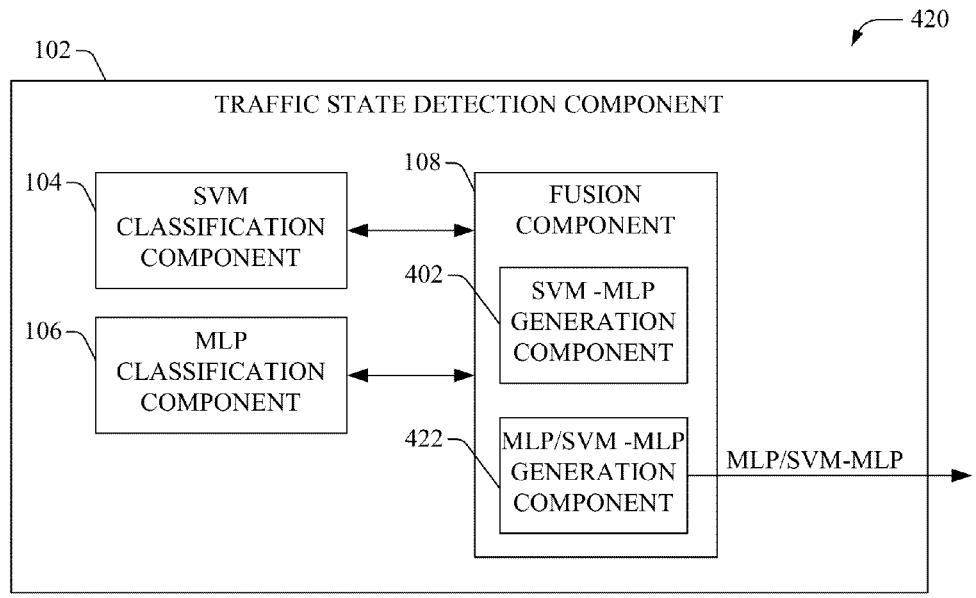

FIG. 4C illustrates is an example system 420 that generates an MLP/SVM-MLP classifier in accordance with an aspect of the subject disclosure. It can be noted that the traffic state detection component 102, SVM classification component 104, MLP classification component 106, fusion component 108, and SVM-MLP generation component 402 can include functionality, as more fully described herein, for example, with regard to systems 100-400.

In one aspect, the fusion component 108 can employ an MLP/SVM-MLP generation component 422 to facilitate generation of a cascaded two-tier classifier, wherein the first tier discriminates congested state from the sample set, by employing the MLP classifier (e.g., utilized by the MLP classification component 106), and the second tier discriminates a sample that is classified as non-congested by the MLP classifier, as busy or unimpeded, by employing the SVM-MLP classifier (e.g., generated by the SVM-MLP generation component 402). As an example, the MLP classifier can be a binary classifier that determines whether the state of a sample is congested or non-congested. Based on the results from the MLP classification component 106, if determined that the sample is in a non-congested state, the MLP/SVM-MLP generation component 422, provides the sample to the SVM-MLP generation component 402 that employs a cascaded two-tier classifier to classify a non-congested sample as having an unimpeded or busy state. Accordingly, the MLP classifier is utilized to separate samples associated with the congested state from the testing set and the SVM-MLP classifier is utilized to classify the remaining non-congested samples classified by the MLP classifier, as being associated with an unimpeded or busy state. The cascading rule in the second tier can be as follows: For a test sample, if the detection result of the SVM classifier is the unimpeded state, this result is the final state of the sample; otherwise, the MLP classifier is utilized to detect the sample, and the output of the MLP classifier is treated as the final state.

Figure 4D:
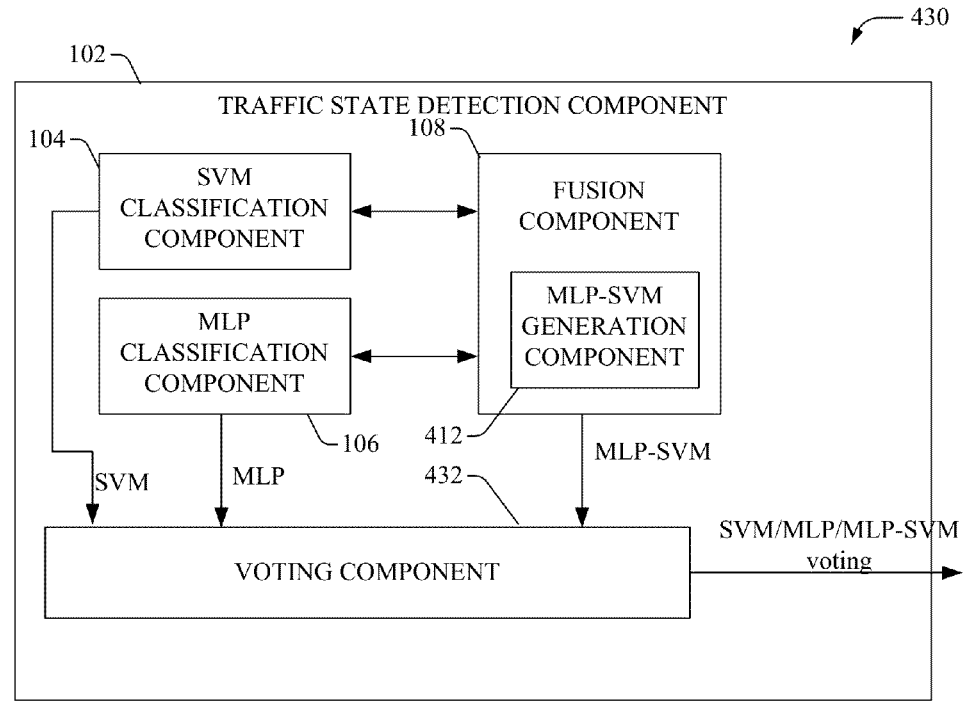

FIG. 4D illustrates is an example system 430 that generates a classification output based on utilizing voting of a cascaded SVM/MLP/MLP-SVM classifier in accordance with an aspect of the subject disclosure. It can be noted that the traffic state detection component 102, SVM classification component 104, MLP classification component 106, fusion component 108, and MLP-SVM generation component 412 can include functionality, as more fully described herein, for example, with regard to systems 100-300 and 410. In one aspect, a voting component 432 can be utilized to assign weights to outputs of the SVM, MLP, and MLP-SVM classifiers. The voting component 432 can record detection accuracy of three classifiers as $p_1$, $p_2$, $p_3$ and compute weights of the three classifiers $\alpha_i$ as follows:

$$\alpha_i = \frac{p_i}{\sum_{j=1}^{3} p_j}, \quad (13)$$

$$i = 1, 2, 3.$$

In one aspect, based on the weights, the voting component 432 can generate a final output regarding traffic state for a testing sample. For example, if the voting component 432 determines that the three classifiers have the same detection decision, then the voting component 432 outputs the decision as the final state. In another example, if the voting component 432 determines that the two of the classifiers generate the same decision, then the voting component 432 outputs the common decision as the final state. Alternatively, if the voting component 432 determines that the three classifiers each generate different decisions, the decision of the classifier with the highest weight is treated is selected the final state.

Table 2 depicts an example comparison of classification accuracy obtained by employing systems 300, 400, 410, 420, and 430 for determining traffic state.

TABLE 2

| Project | Number of training samples | Number of test samples | Classification accuracy |
| --- | --- | --- | --- |
| SVM (Gaussian kernel) | 1,730 | 1,440 | 85.13% (1226/1440) |
| MLP | 1,730 | 1,440 | 80.07% (1153/1440) |
| SVM-MLP | 1,730 | 1,440 | 82.57% (1190/1440) |
| MLP-SVM | 1,730 | 1,440 | 86.66% (1248/1440) |
| MLP/SVM-MLP | 1,730 | 1,440 | 87.01% (1253/1440) |
| SVM/MLP/MLP-SVM voting | 1,730 | 1,440 | 88.26% (1271/1440) |

Figure 5A:
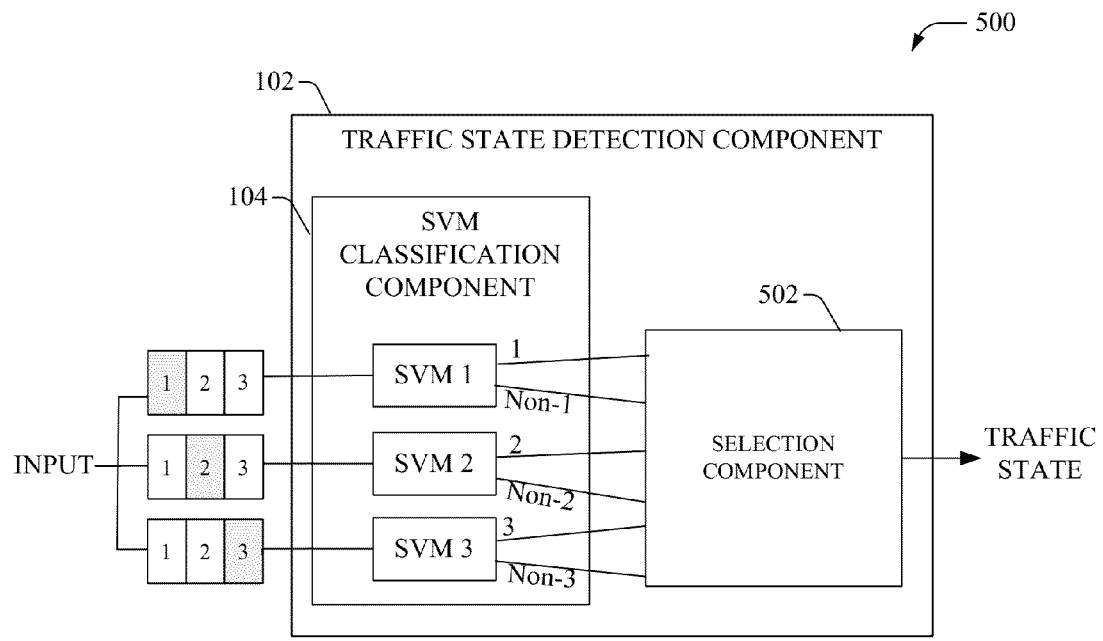
FIGS. 5A-5B illustrate example systems that facilitate traffic state determination based on a three-class classification strategy.
Figure 5B:
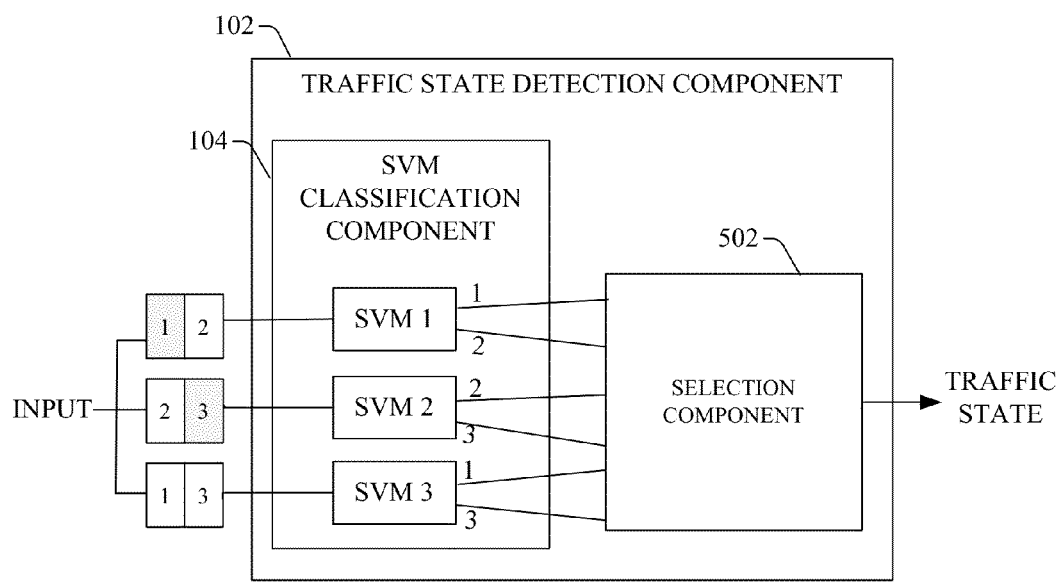

Referring now to FIG. 5A-5B there illustrated are example systems 500 and 510 that facilitate traffic state determination based on a three-class classification strategy in accordance with an aspect of the subject disclosure. It can be noted that the traffic state detection component 102 and the SVM classification component 104 can include functionality, as more fully described herein, for example, with regard to systems 100-430.

System 500 depicts a three-class classification system that employs a one-against-all strategy for traffic state determination. Moreover, three binary classifiers (SVM1 to SVM3) based on SVM classification can be utilized by the SVM classification component 104. As an example, "1" denotes an unimpeded state, "Non-1" denotes a traffic state that is not unimpeded; "2" denotes a busy state, "Non-2" denotes a traffic state that is not busy; and "3" denotes a congested state and "Non-3 for a traffic state that is not congested. In one aspect, the SVM classification component 104 employs SVM1 to classify a state as unimpeded or not, SVM2 to classify a state as busy or not, and SVM3 to classify a state as congested or not. The detection accuracies of the three classifiers are shown in Table 3. The final decision regarding traffic state is determined by a selection component 502 that employs a selection rule, given by Table 4. "By weight $\alpha_i$," in the Table 4 represents decision of the SVM with the highest weight is the final decision. In one example, weights $\alpha_i$ can be determined based on detection accuracy. The final classification results (after voting) are shown in Table 3.

TABLE 3

| | SVM1 (for unimpeded) | SVM2 (for busy) | SVM3 (for congested) | After voting (for overall) |
|---|---|---|---|---|
| one-against-all | 90.49% (1303/1440) | 85% (1224/1440) | 94.93% (1367/1440) | 85.13% (1226/1440) |
| one-against-one | 87.36% (1140/1305) | 79.11% (553/699) | 86.03% (754/876) | 82.57% (1189/1440) |

TABLE 4

| | States | | | | | | | |
|---|---|---|---|---|---|---|---|---|
| SVM1 | 1 | 1 | 1 | 1 | Non-1 | Non-1 | Non-1 | Non-1 |
| SVM2 | 2 | 2 | Non-2 | Non-2 | 2 | 2 | Non-2 | Non-2 |
| SVM3 | 3 | Non-3 | 3 | Non-3 | 3 | Non-3 | 3 | Non-3 |
| Final state | By weight $\alpha_i$ | By weight $\alpha_i$ | By weight $\alpha_i$ | 1 | By weight $\alpha_i$ | 2 | 3 | By weight $\alpha_i$ |

System 510 depicts a three-class classification system that employs a one-against-one strategy for traffic state determination. In this example scenario, the SVM classification component 104 employs SVM1 to classify a state as unimpeded or busy, SVM2 to classify a state as busy or congested, and SVM3 to classify a state as unimpeded or congested. The detection accuracies of the three classifiers are shown in Table 3. The final decision regarding traffic state is determined by the selection component 502 that employs a selection rule, given by Table 5. "By weight $\alpha_i$" in Table 5 represents decision with the highest weight as the final decision. In one example, weights $\alpha_i$ can be determined based on detection accuracy. The final classification results (after voting) are shown in Table 3.

TABLE 5

| | States | | | | | | | |
|---|---|---|---|---|---|---|---|---|
| SVM1 | 1 | 1 | 1 | 1 | 2 | 2 | 2 | 2 |
| SVM2 | 2 | 2 | 3 | 3 | 2 | 2 | 3 | 3 |
| SVM3 | 1 | 3 | 1 | 3 | 1 | 3 | 1 | 3 |
| Final state | 1 | By weight $\alpha_i$ | 1 | 3 | 2 | 2 | By weight $\alpha_i$ | 3 |

Figure 6:
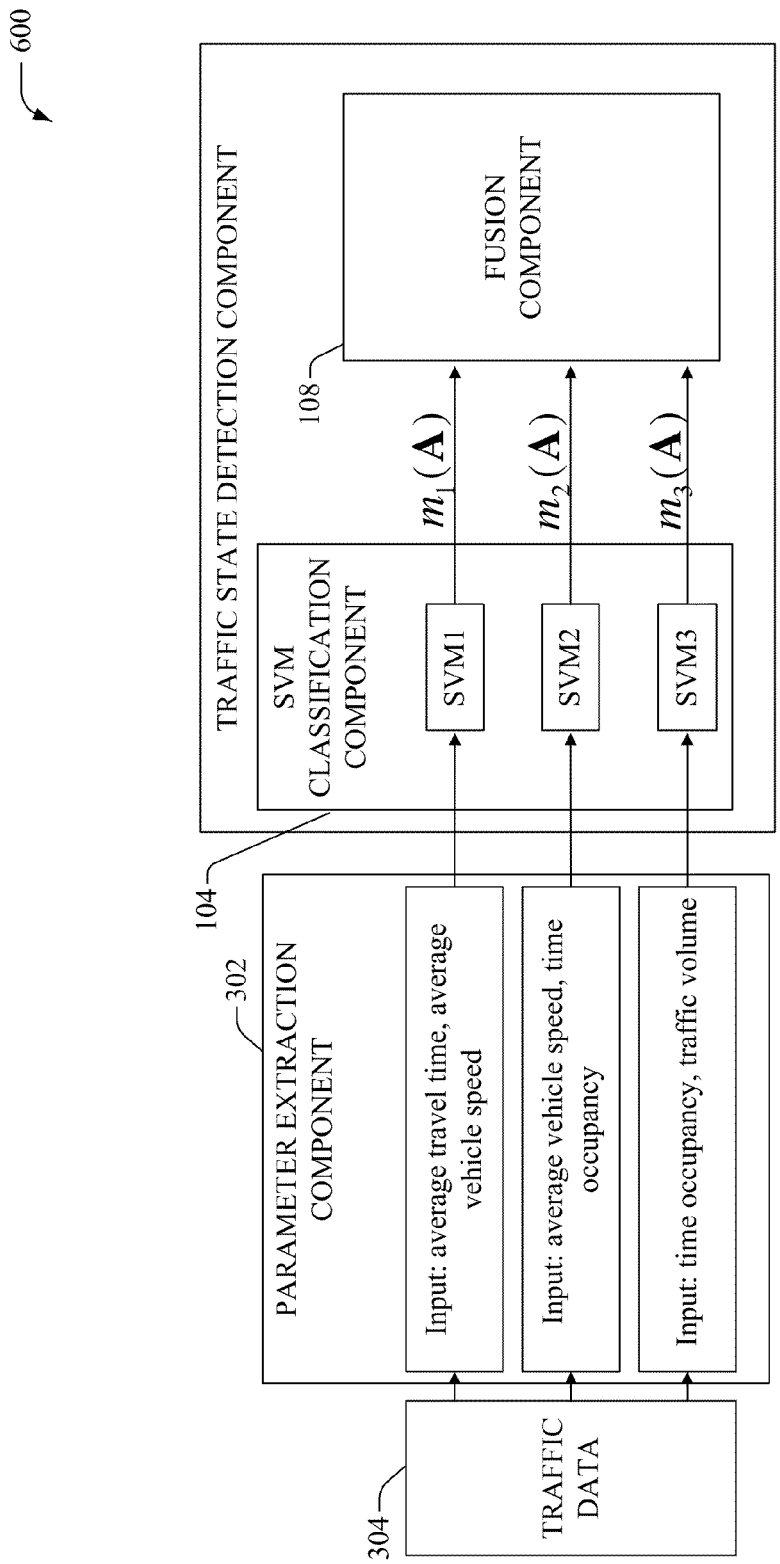
FIG. 6 illustrates an example system that facilitates classification based on Dempster-Shafer (D-S) theory of evidence.

FIG. 6 illustrates an example system 600 that facilitates classification based on D-S theory of evidence in accordance with an aspect of the subject disclosure. It can be noted that the traffic state detection component 102, SVM classification component 104, fusion component 108, parameter extraction component 302, traffic data 304, can include functionality, as more fully described herein, for example, with regard to systems 100-500. In one aspect, the parameter extraction component 302 can analyze the traffic data 304 to determine parameters such as (but not limited to) average travel time, average vehicle speed, time occupancy, and/or traffic volume. The SVM classification component 104 can employ three binary classifiers (SVM1 to SVM3), wherein SVM1 can be an SVM classifier trained with travel time and occupancy as input parameters, SVM2 can be an SVM classifier trained with vehicle speed and occupancy as input parameters, and SVM3 can be SVM classifier trained with occupancy and volume as input parameters. After training SVM1, SVM2 and SVM3, the example detection accuracies are shown in Tables 6 and 7 below. $m_i(A)$, i=1, 2, 3, denote the basic probability assignments of A. After decision fusion using D-S rule, the classification decision is shown in Table 7.

TABLE 6

| | | Unimpeded (1) | Busy (2) | Congested (3) |
|---|---|---|---|---|
| SVM1 (travel time, occupancy) | Unimpeded | 69.77% (517/741) | 29.97% (220/741) | 0.54% (4/741) |
| | Busy | 22.48% (127/565) | 72.57% (410/565) | 4.96% (28/565) |

TABLE 6-continued

| | | Unimpeded (1) | Busy (2) | Congested (3) |
|---|---|---|---|---|
| occupancy) | Congested | 2.94% (1/134) | 34.33% (46/134) | 64.93% (87/134) |
| SVM2 (vehicle speed, occupancy) | Unimpeded | 87.31% (647/741) | 12.69% (94/741) | 0% (0/741) |
| | Busy | 10.62% (60/565) | 81.42% (460/565) | 7.97% (45/565) |
| | Congested | 0% (0/134) | 27.61% (37/134) | 72.39% (97/134) |
| SVM3 (occupancy, | Unimpeded | 94.20% (698/741) | 5.80% (43/741) | 0% (0/741) |

TABLE 6-continued

|  |  | Unimpeded (1) | Busy (2) | Congested (3) |
|---|---|---|---|---|
| volume) | Busy | 26.55% (150/565) | 72.57% (410/565) | 0.89% (5/565) |
|  | Congested | 29.85% (40/134) | 57.46% (77/134) | 12.69% (17/134) |

TABLE 7

| Classifier | SVM1 | SVM2 | SVM3 | Decision |
|---|---|---|---|---|
| Detection accuracy | 70.12% | 84.61% | 79.83% | 90.54% |

Figure 7:
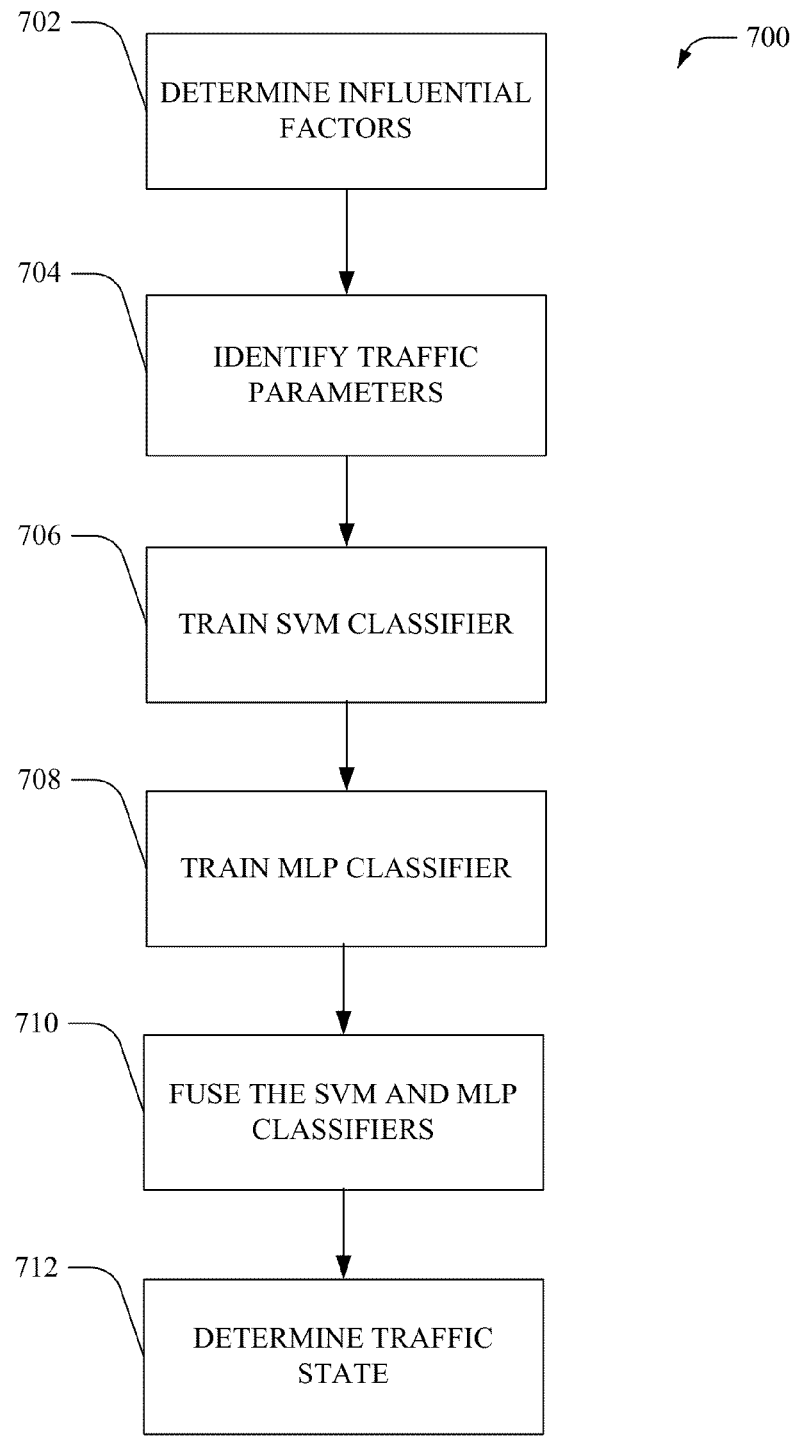
FIG. 7 illustrates an example method that can be utilized to facilitate fusion-based traffic detection.
Figure 8:
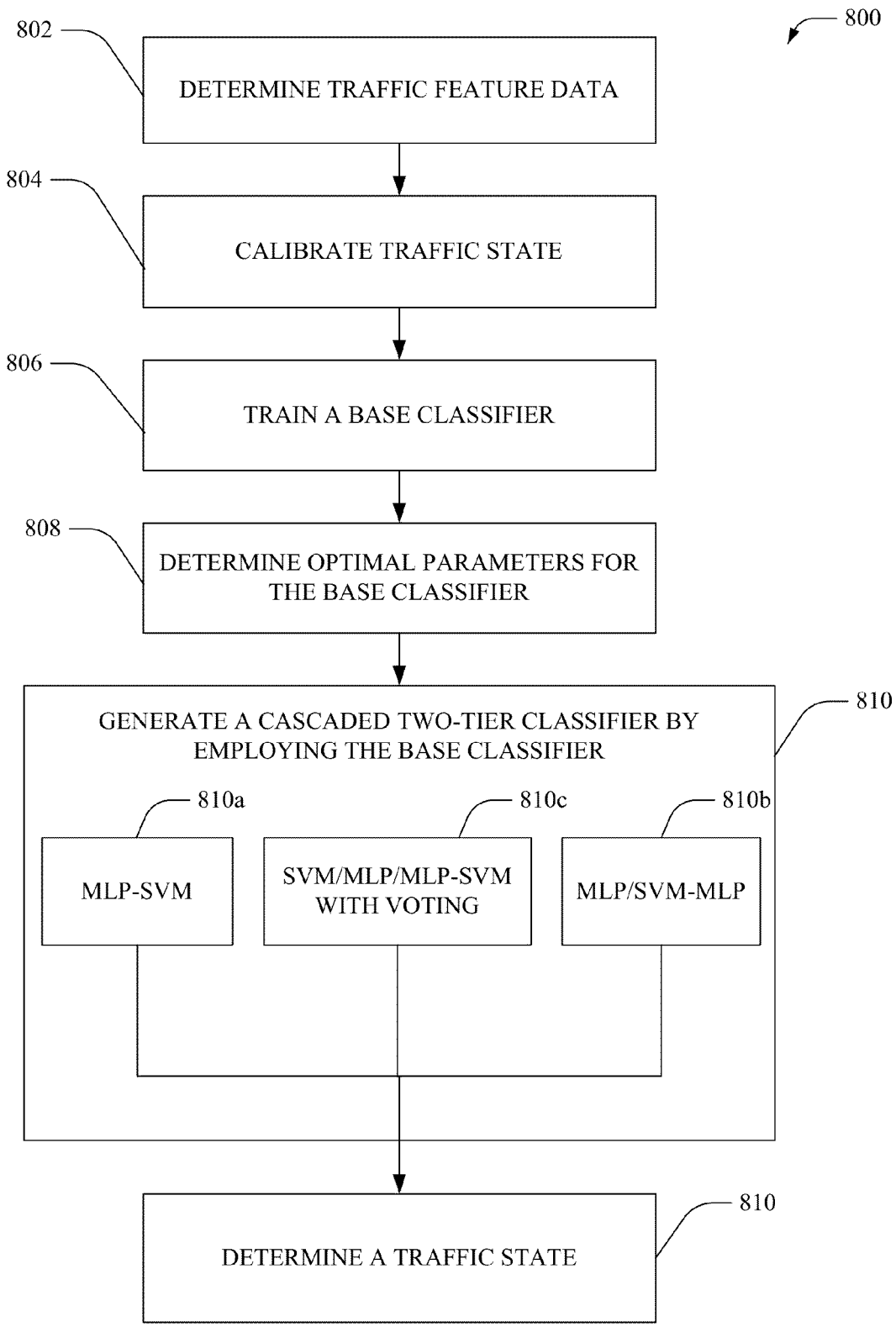
FIG. 8 illustrates an example method that facilitates detection of a traffic state based on a cascaded two-tier classifier.
Figure 9:
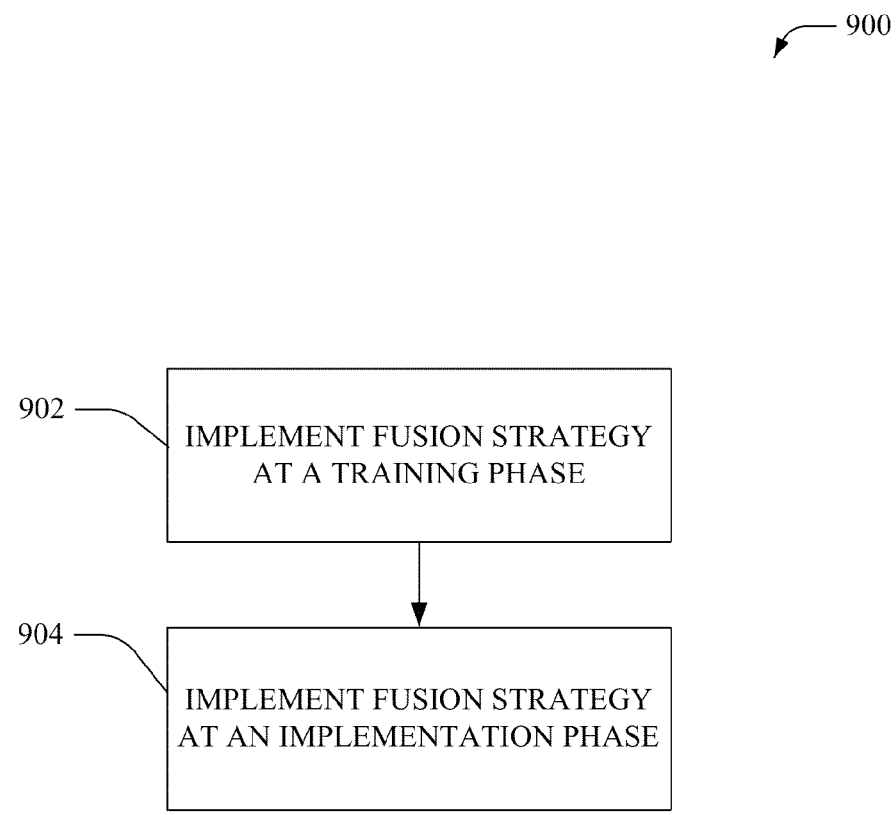
FIG. 9 illustrates an example method that utilizes a fusion strategy to improve traffic state detection accuracy.

FIGS. 7-9 illustrate methods and/or flow diagrams in accordance with the disclosed subject matter. For simplicity of explanation, the methods are depicted and described as a series of acts. It is to be understood and appreciated that the subject embodiments is not limited by the acts illustrated and/or by the order of acts, for example acts can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram of events. Additionally, it should be further appreciated that the methods disclosed hereinafter and throughout this specification are capable of being stored on an article of manufacture to facilitate transporting and transferring such methods to computers. The term article of manufacture, as used herein, is intended to encompass a computer program accessible from any computer-readable device or computer-readable storage/communications media.

Referring now to FIG. 7, illustrated is an example method 700 that can be utilized to facilitate fusion-based traffic detection, according to an aspect of the subject specification. At 702, influential factors can be determined (e.g., by the parameter extraction component 302). For example, influential factors can include factors such as (but not limited to) fixed factors (e.g., lane conditions, traffic lights, roads, walkways, etc.) and/or random factors (e.g., changes in weather, accidents, etc.). These factors are typically reflected as changes in the values of traffic parameters (e.g., vehicle speed and/or traffic volume). At 704, traffic parameters can be identified (e.g., by the parameter extraction component 302), for example, based on analyzing traffic data and/or simulation data (e.g., generated by employing a microscopic multi-modal traffic flow simulation system). As an example, the traffic parameters can include (but are not limited to) average vehicles speed, traffic volume, vehicles, time occupancy, and/or travel time.

At 706, an SVM classifier can be trained (e.g., by the training component 308), for example, by employing traffic samples determined from the simulation data. Further, at 708, an MLP classifier can be trained (e.g., by the training component 308), for example, based on the traffic samples determined from the simulation data. At 710, the SVM and MLP classifiers can be fused to generate a cascaded two-tier classifier (e.g., by the fusion component 108). For example, the cascaded two-tier classifier can include (but is not limited to) an SVM-MLP classifier, an MLP-SVM classifier, an MLP/SVM-MLP classifier, a weighted SVM/MLP/MLP-SVM classifier, etc. In one example, D-S theory of evidence can be employed to facilitate the fusion of the classifiers and improve accuracy of traffic state detection. At 712, the result from the fused classifier can be utilized to determine the traffic state (e.g., by the traffic state detection component 102). For example, the traffic state can be utilized by traffic guidance and/or management systems to control traffic flow and/or prevent accidents.

FIG. 8 illustrates an example method 800 that facilitates detection of a traffic state based on a cascaded two-tier classifier in accordance with an aspect of the subject specification. Moreover, method 800 significantly improves accuracy of traffic state detection, which can be utilized to reduce adverse effects of traffic incidents (e.g., traffic congestion) and ensure safe and/or comfortable driving conditions. At 802, traffic feature data can be determined (e.g., by the parameter extraction component 302). For example, based on microwave data of an area, a simulation file depicting of vehicle environment can be generated during a predefined time period for each traffic state to evaluate a traffic state for each sample. Further, at 804 traffic state can be calibrated (e.g., by the parameter extraction component 302). As an example, the states of the samples can be determined through a simulation file. The simulation file can display the environment of the vehicles on the road, so that the traffic states of the corresponding data can be determined from the simulation file. Compared to other methods such as deciding a congested state based on whether the average vehicle speed is below a fixed threshold, traffic state calibration based on data from the simulation file, gives a result that is closer to the actual traffic state.

At 806, a base classifier can be trained (e.g., by the training component 308). For example, the base classifier can include an SVM classifier. At 808, optimal parameters for the base classifier can be determined (e.g., by the training component 308). In one aspect, during the training of the SVM classifier, four kernel functions (linear, polynomial, Gaussian radial basis, and/or sigmoidal function) are tried, and cross-validated to determine optimal parameters. The Gaussian radial basis function can be selected as the optimal kernel function. Further, at 810, a cascaded two-tier classifier can be generated by employing the base classifier (e.g., by the fusion component 108). For example, at 810a, SVM and MLP classifiers can be fused into a cascaded classifier MLP-SVM, wherein the first tier is an MLP classifier that identifies whether the state of a sample is congested or not, and the second tier is an SVM classifier which further identifies a sample that is judged as non-congested by the MLP classifier, as being in an unimpeded or busy state. In another example, at 810b, an MLP classifier and an SVM-MLP classifier can be fused into a cascaded classifier MLP/SVM-MLP, wherein the first tier includes a binary MLP classifier for separation of samples having a congested state, and the second tier classifies samples as having unimpeded or busy states by cascading a binary SVM classifier and another binary MLP classifier. In yet another example, at 810c, an SVM classifier, MLP classifier, and MLP-SVM classifier can be fused as a voting classifier SVM/MLP/MLP-SVM, and a weighted voting method can be employed to detect the urban road traffic state. In one aspect, weights of the three classifiers (SVM classifier, MLP classifier, and MLP-SVM classifier) can be determined based on the respective detection accuracies of the classifiers. As an example, for a test sample, if the three classifiers produce the same detection decision, this decision is the final state of the sample; if two classifiers produce the same decision, this decision is treated as the final state; and if the three classifiers generate different decisions, the output of the classifier with the largest weight is selected as the final state.

Further, at 812, a traffic state can be determined based on an output of the cascaded two-tier classifier (e.g., by the traffic state detection component 102).

FIG. 9 illustrates an example method 900 that utilizes a fusion strategy to improve traffic state detection accuracy, according to an aspect of the subject disclosure. At 902, the fusion strategy can be implemented at the training phase (e.g., by the fusion component 108). In one aspect a training set of sample data utilized to train a classifier can be divided into a number of subsets, for example, eight parts, marked $R_i$, i=1, 2, ..., 8. The training set can be utilized to train a Gaussian kernel based SVM classifier and/or a cascaded two-tier MLP-SVM classifier as the base classifier#1. Moreover, the base classifier#1 can then be utilized to test $R_1$, pick out the incorrectly detected samples and mark them as $W_1$. Further, a base classifier#2 can be created with a training set composed of $W_1$ and $R_2$. The base classifier#2 can test $W_1$ and $R_2$, pick out the incorrectly detected samples and mark them as $W_2$. Furthermore, a base classifier#3 can be generated with a training set composed of $W_2$ and $R_3$, and utilized to test $W_2$ and $R_3$, and pick out the incorrectly detected samples and mark them as $W_3$, so on and so forth. By analogy, eight base classifiers can be generated which can be fused by ensemble learning to generate an enhanced classifier. This method can reduce the unclassified region of basic classifiers, and improve the classification accuracy.

At 904, the fusion strategy can be implemented at an implementation phase (e.g., by the fusion component 108). For example, during the implementation phase, detection results of a base classifier can be fused at multiple consecutive time instants, to determine a final traffic state detection decision. In an example scenario wherein the road traffic state is released at one minute intervals and data samples are recorded every minute, the fusion procedure can be given as follows: (i) An SVM, MLP-SVM or most any three-class classifier can be employed as a base classifier; (ii) The traffic state can be classified at each minute for the samples obtained at the first four minutes and the classification decisions can be recorded. These decisions can be released as the final classification decisions; (iii) After determining the classification decisions for the first five minutes, ensemble learning theory can be utilized to vote for the five classification decisions and a new decision can be obtained and released as the final decision at the 5th minute; (iv) From the 6th minute onwards, after having the classification decision of the $m^{th}$ minute (m>5), the decisions at minute m−4, m−3, m−2, m−1, m can be fused to generate a final classification decision at minute m. This fusion algorithm can significantly reduce the inaccuracies in data due to data acquisition and classification errors caused by noise and outliers and can substantially improve the overall classification accuracy.

Figure 10:
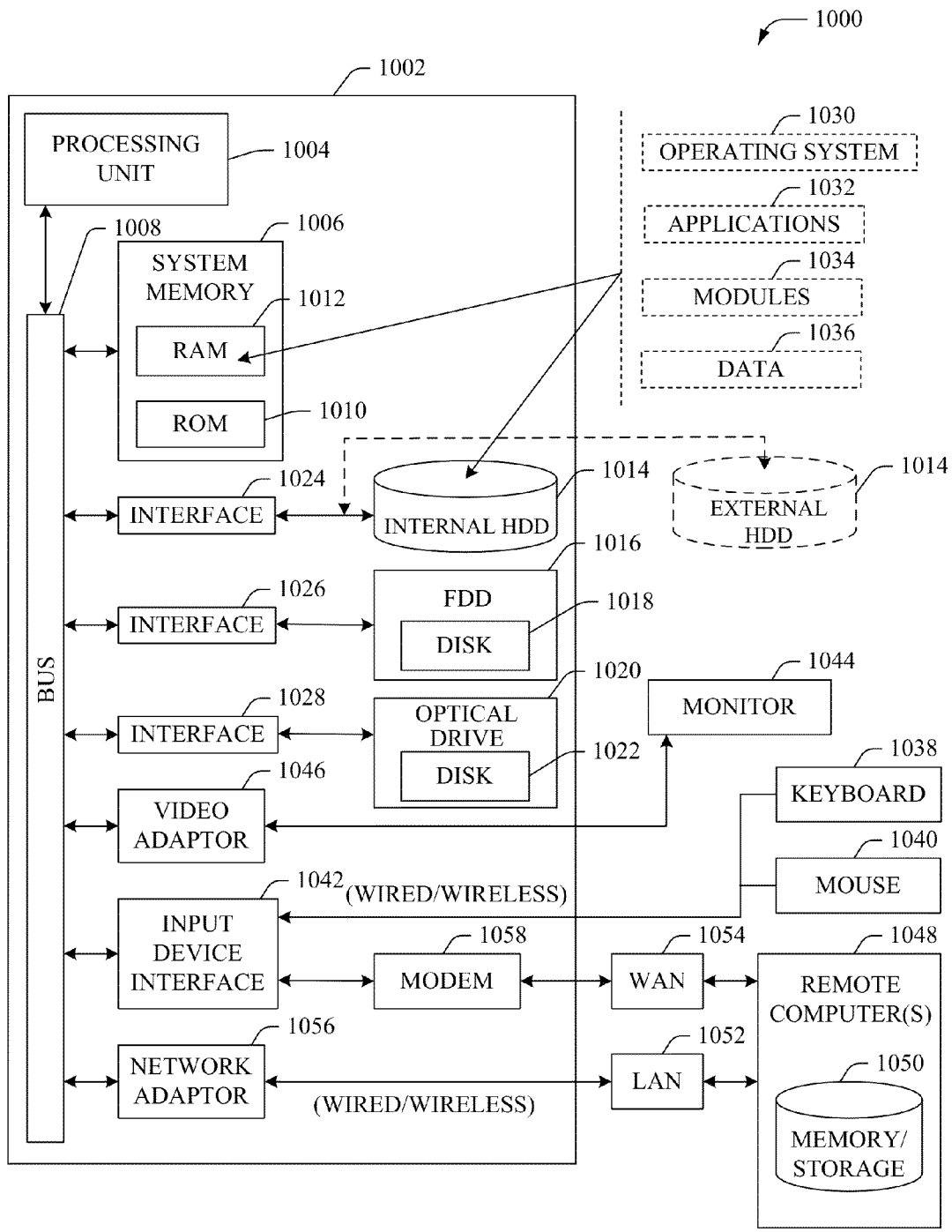
FIG. 10 illustrates a block diagram of a computer operable to execute the disclosed classification architecture.

Referring now to FIG. 10, there is illustrated a block diagram of a computer operable to execute the disclosed classification architecture. In order to provide additional context for various aspects of the subject specification, FIG. 10 and the following discussion are intended to provide a brief, general description of a suitable computing environment 1000 in which the various aspects of the specification can be implemented. While the specification has been described above in the general context of computer-executable instructions that can run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, radio frequency (RF), infrared and other wireless media.

With reference again to FIG. 10, the example environment 1000 for implementing various aspects of the specification includes a computer 1002, the computer 1002 including a processing unit 1004, a system memory 1006 and a system bus 1008. As an example, the system(s) and/or component(s) (e.g., traffic state detection component 102, SVM classification component 104, MLP classification component 106, fusion component 108, parameter extraction component 302, simulation component 306, training component 308, SVM-MLP generation component 402, MLP-SVM generation component 412, MLP/SVM-MLP generation component 422, voting component 432, selection component 502, etc.) disclosed herein with respect to system 100-600 can each include at least a portion of the computer 1002. In another example, a combination of the systems and/or components can each include one or more computers such as, or substantially similar to, computer 1002. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes read-only memory (ROM) 1010 and random access memory (RAM) 1012. A basic input/output system (BIOS) is stored in a non-volatile memory 1010 such as ROM, EPROM, EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies. Other external drive connection technologies are within contemplation of the subject specification.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to a HDD, a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods of the specification.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is appreciated that the specification can be implemented with various commercially available operating systems or combinations of operating systems.

A user can enter commands and information into the computer 1002 through one or more wired/wireless input devices, e.g., a keyboard 1038 and a pointing device, such as a mouse 1040 or a touchscreen or touchpad (not illustrated). These and other input devices are often connected to the processing unit 1004 through an input device interface 1042 that is coupled to the system bus 1008, but can be connected by other interfaces, such as a parallel port, an IEEE 1394 serial port, a game port, a USB port, an infrared (IR) interface, etc. A monitor 1044 or other type of display device is also connected to the system bus 1008 via an interface, such as a video adapter 1046.

The computer 1002 can operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 is connected to the local network 1052 through a wired and/or wireless communication network interface or adapter 1056. The adapter 1056 can facilitate wired or wireless communication to the LAN 1052, which can also include a wireless access point disposed thereon for communicating with the wireless adapter 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 via the serial port interface 1042. In a networked environment, program modules depicted relative to the computer 1002, or portions thereof, can be stored in the remote memory/storage device 1050. It will be appreciated that the network connections shown are example and other means of establishing a communications link between the computers can be used.

The computer 1002 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

It will be appreciated that the memory components, or computer-readable storage media, described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

What has been described above includes examples of the present specification. It is, of course, not possible to describe every conceivable combination of components or methodologies for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
a memory configured to store computer-executable components; and
a processor, communicatively coupled to the memory, configured to execute or facilitate execution of the computer-executable components, the computer-executable components comprising:
a parameter extraction component configured to determine simulation data that represents an environment of a set of vehicles within a specified area; and
a fusion component configured to generate a cascaded two-tier classifier based on a first fusion of a first support vector machine classifier and a first multilayer perceptron classifier, wherein the fusion component is further configured to facilitate traffic state detection based on a second fusion of the cascaded two-tier classifier with a second support vector machine classifier and a second multilayer perceptron classifier, and wherein the cascaded two-tier classifier is trained based in part on the simulation data.

2. The system of claim 1, wherein the computer-executable components further comprise:
a traffic state detection component configured to employ the cascaded two-tier classifier to determine state data representing a final traffic state for a data sample, wherein the final traffic state is one of a congested state, a busy state, or an unimpeded state.

3. The system of claim 2, wherein the cascaded two-tier classifier includes:
a tier comprising the first multilayer perceptron classifier that is configured to classify the data sample as being in the congested state or a non-congested state.

4. The system of claim 3, wherein the tier is a first tier and the cascaded two-tier classifier includes:
a second tier comprising the first support vector machine classifier that is configured to classify the data sample as being in the unimpeded state or the busy state, in response to the data sample determined to being classified as being in the non-congested state by the first multilayer perceptron classifier.

5. The system of claim 1, wherein the computer-executable components further comprise:
a voting component configured to analyze respective classification outputs of the cascaded two-tier classifier, the second support vector machine classifier, and the second multilayer perceptron classifier, to facilitate a determination of the state data.

6. The system of claim 5, wherein the voting component is further configured to select first classification output data as the state data in response to the cascaded two-tier classifier, the second support vector machine classifier, and the second multilayer perceptron classifier generating the first classification output data.

7. The system of claim 5, wherein the voting component is further configured to determine weight data indicative of respective weights for the cascaded two-tier classifier, the second support vector machine classifier, and the second multilayer perceptron classifier based on detection accuracy data associated with the cascaded two-tier classifier, the second support vector machine classifier, and the second multilayer perceptron classifier.

8. The system of claim 7, wherein the voting component is further configured to select as the state data, output data representing an output of a classifier, wherein the classifier is selected from the cascaded two-tier classifier, the second support vector machine classifier, and the second multilayer perceptron classifier based on the weight data.

9. The system of claim 1, wherein the fusion is based on Dempster-Shafer theory of evidence.

10. The system of claim 3, wherein the tier is a first tier and the cascaded two-tier classifier is a first cascaded two-tier classifier that includes:
a second tier comprising a second cascaded two-tier classifier that is configured to employ the first support vector machine classifier to classify the data sample as being in the unimpeded state or a non-unimpeded state, in response to the data sample determined to being classified as being in the non-congested state by the first multilayer perceptron classifier,
wherein the second cascaded two-tier classifier is further configured to employ a third multilayer perceptron classifier to classify the data sample as being in the busy state, in response to the data sample determined to being classified as being in the non-unimpeded state by the support vector machine classifier.

11. A method, comprising:
determining, by a system including a processor, parameter data indicative of a set of traffic parameters based on simulation data that represents an environment of a set of vehicles within a specified area;
training, based on the parameter data, a cascaded two-tier classifier that is determined based on a first combination of a first support vector machine classifier and a first multilayer perceptron classifier; and
determining state data indicative of a state of traffic within the specified area based on employing a second combination of the cascaded two-tier classifier with a second support vector machine classifier and a second multilayer perceptron classifier.

12. The method of claim 11, wherein the determining the state data comprises determining data indicative of one of a congested state, a busy state, or an unimpeded state.

13. The method of claim 11, wherein the first combination combining is based on Dempster-Shafer theory of evidence.

14. The method of claim 11, further comprising:
implementing a fusion strategy during the training to generate an enhanced classifier, wherein the determining includes determining the state data based on output data received from the enhanced classifier.

15. The method of claim 14, wherein the implementing includes:
dividing a training data set into at least two subsets;
employing the training data set to train a first base classifier, wherein the first base classifier includes the first support vector machine classifier;
employing the first base classifier to test a first subset of the at least two subsets and determine first data indicative of a first set of incorrectly detected samples;
employing a second base classifier to test the first set of incorrectly detected samples and a second subset of the at least two subsets, and determine second data indicative of a second set of incorrectly detected samples; and
combining the first base classifier and the second base classifier based on ensemble learning.

16. The method of claim 11, further comprising:
applying a fusion strategy that facilitates combining detection results of a base classifier at a plurality of consecutive time instants to facilitate the determining the state data, wherein the base classifier includes one of the cascaded two-tier classifier or the first support vector machine classifier.

17. A non-transitory computer readable medium comprising computer-executable instructions that, in response to execution, cause a system comprising a processor to perform operations, comprising:
based on simulation data that represents an environment of a set of vehicles within a specified area, determining parameter data indicative of a set of traffic parameters;
training, based on the set of traffic parameters, a cascaded two-tier classifier that is generated based on combining a first support vector machine classifier and a first multilayer perceptron classifier; and
classifying a state of traffic within the specified area based on a combining the cascaded two-tier classifier with a second support vector machine classifier and a second multilayer perceptron classifier.

18. The non-transitory computer readable medium of claim 17, wherein the state of the traffic is one of a congested state, a busy state, and an unimpeded state.

19. The non-transitory computer readable medium of claim 17, wherein the parameter data is indicative of at least one of an average speed of vehicles within the specified area, a total number of the vehicles that travel through the specified area during a predefined time interval, a travel time indicative of time taken by a first vehicle of the vehicles to pass the specified area, or a ratio of the travel time to the predefined time interval.

20. The non-transitory computer readable medium of claim 17, wherein the combining of the first support vector machine classifier and the first multilayer perceptron classifier is based on Dempster-Shafer theory of evidence.

* * * * *